(12) United States Patent
Nakashima

(10) Patent No.: US 10,567,818 B2
(45) Date of Patent: *Feb. 18, 2020

(54) VIDEO CONTENT DISTRIBUTION SYSTEM AND CONTENT MANAGEMENT SERVER

(71) Applicant: COLOPL, Inc., Tokyo (JP)

(72) Inventor: Kento Nakashima, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,511

(22) Filed: Dec. 10, 2018

(65) Prior Publication Data

US 2019/0116388 A1    Apr. 18, 2019

Related U.S. Application Data

(63) Continuation of application No. 15/348,909, filed on Nov. 10, 2016, now Pat. No. 10,171,851.

(30) Foreign Application Priority Data

Dec. 24, 2015   (JP) .................................. 2015-252311

(51) Int. Cl.
*H04N 21/2387* (2011.01)
*H04N 13/00* (2018.01)
(Continued)

(52) U.S. Cl.
CPC ......... *H04N 21/2387* (2013.01); *H04N 13/00* (2013.01); *H04N 21/21805* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 6,002,694 A | * | 12/1999 | Yoshizawa | ............. H04N 5/913 348/E7.061 |
| 7,900,233 B1 | * | 3/2011 | Godin | ...................... H04N 5/76 348/180 |

(Continued)

FOREIGN PATENT DOCUMENTS

JP         5377466 B2    12/2013

*Primary Examiner* — Alexander Gee
(74) *Attorney, Agent, or Firm* — Hauptman Ham, LLP

(57) ABSTRACT

A video content distribution system including a user terminal and a content management server connected via a communication network. The content management server continues transmitting field-of-view video data associated with a first viewpoint to the user terminal at least for a time period from the time when a transmission unit transmits a viewpoint switch request signal for requesting a switch from the first viewpoint to a second viewpoint to the time when a reception unit receives field-of-view video data associated with the second viewpoint. In response to the reception unit receiving the viewpoint switch request signal, a viewing stop time determining unit determines a first viewing stop time at which viewing display stops displaying the field-of-view video from the first viewpoint, and a viewing start time determining unit determines a second viewing start time at which the display start displaying the field-of-view video from the second viewpoint.

15 Claims, 16 Drawing Sheets

(51) Int. Cl.

| | |
|---|---|
| *H04N 21/218* | (2011.01) |
| *H04N 21/472* | (2011.01) |
| *H04N 21/81* | (2011.01) |
| *H04N 21/2543* | (2011.01) |
| *H04N 21/438* | (2011.01) |
| *H04N 13/344* | (2018.01) |

(52) U.S. Cl.
CPC ..... *H04N 21/2543* (2013.01); *H04N 21/4383* (2013.01); *H04N 21/47202* (2013.01); *H04N 21/816* (2013.01); *H04N 13/344* (2018.05)

(56) References Cited

U.S. PATENT DOCUMENTS

| | | | |
|---|---|---|---|
| 2003/0121048 A1* | 6/2003 | Hwang | G06Q 30/02 725/93 |
| 2006/0075456 A1 | 4/2006 | Gray et al. | |
| 2009/0089844 A1* | 4/2009 | Beyabani | H04N 7/17318 725/87 |
| 2009/0290852 A1 | 11/2009 | Wright | |
| 2013/0058626 A1* | 3/2013 | Avina | H04N 5/76 386/241 |
| 2013/0202265 A1 | 8/2013 | Arrasvuori et al. | |
| 2014/0328578 A1 | 11/2014 | Shafron et al. | |
| 2015/0082364 A1* | 3/2015 | Jayaram | H04N 21/4622 725/109 |
| 2015/0281774 A1* | 10/2015 | Atkin | H04N 21/64322 725/14 |
| 2015/0363060 A1 | 12/2015 | Gaunt et al. | |

\* cited by examiner

FIG. 9

USER VIEWPOINT INFORMATION MANAGEMENT TABLE

| USER ID | SEAT | TRANSMISSION START TIME |
|---------|------|-------------------------|
| df678w  | S    | 00:03                   |
| ...     | ...  | ...                     |

FIG. 10

USER CHARGE INFORMATION MANAGEMENT TABLE

| USER ID | SEAT | PER-HOUR CHARGE (YEN) | ACCUMULATED VIEWING PERIOD (MIN) | SEAT CHARGE (YEN) | TOTAL AMOUNT (YEN) |
|---|---|---|---|---|---|
| df678w | S | ¥1000 | 20 | ¥333 | ¥667 |
| | A | ¥800 | 10 | ¥133 | |
| | B | ¥700 | 5 | ¥58 | |
| | C | ¥500 | 5 | ¥42 | |
| | D | ¥300 | 20 | ¥100 | |

FIG. 11

CONTENT MANAGEMENT TABLE

| SEAT | CONTENT SERVER ADDRESS |
|---|---|
| S | . . . |
| A | . . . |
| B | . . . |
| C | . . . |
| D | . . . |

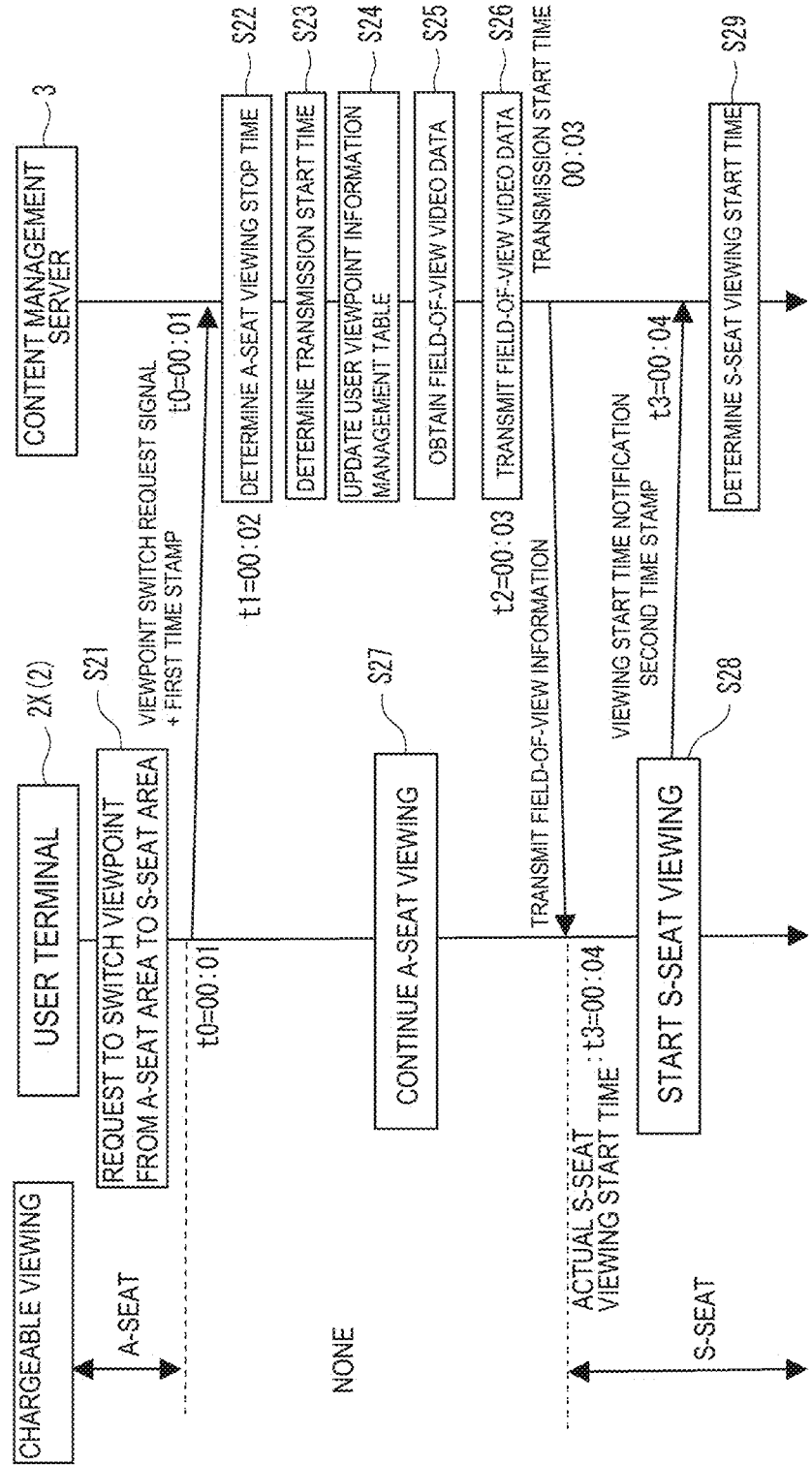

VIDEO CONTENT DISTRIBUTION SYSTEM AND CONTENT MANAGEMENT SERVER

RELATED APPLICATIONS

The present application is a continuation of U.S. patent application Ser. No. 15/348,909 filed Nov. 10, 2016, which claims priority to Japanese Application Number 2015-252311, filed Dec. 24, 2015. The disclosures of all of the above-listed prior-filed applications are hereby incorporated by reference herein in their entirety.

BACKGROUND

This disclosure relates to a video content distribution system and a content management server that is provided in the video content distribution system.

Video content distribution systems are configured to distribute video contents over the Internet or other communication. In Japanese Patent No. 5,377,466, there is disclosed a video content distribution system configured to distribute a plurality of video contents over a communication network to the general public. Each user can view a video content of his/her choice by selecting a channel that is associated with the video content out of a plurality of channels.

While the video content distribution system disclosed in Japanese Patent No. 5,377,466 allows a user to view a video content that is selected by the user out of a plurality of video contents, a video content distribution system that enables a user to view the same video content from different viewpoints is not disclosed in Japanese Patent No. 5,377,466.

SUMMARY

An object of at least one embodiment of this disclosure is to provide a video content distribution system capable of improving a degree of satisfaction with a video content distribution service for a user who views the same video content from different viewpoints. An object of at least one embodiment of this disclosure is to provide a content management server that is provided in the video content distribution system.

According to at least one embodiment of this disclosure, there is provided a video content distribution system, including a user terminal on which contents are viewable and a content management server. The user terminal and the content management server are connected in a manner that allows communication to one another via a communication network.

The user terminal includes a first reception unit configured to receive field-of-view video data from the content management server. The user terminal further includes a display control unit configured to display on a display unit a field-of-view video based on the received field-of-view video data. The user terminal further includes a viewpoint switch request signal generating unit configured to generate, in response to input operation performed by a user on the user terminal, a viewpoint switch request signal for requesting a switch from a first viewpoint, which is a current viewpoint, to a second viewpoint in the field-of-view video displayed on the display unit. The user terminal further includes a first transmission unit configured to transmit the generated viewpoint switch request signal to the content management server.

The content management server includes a second reception unit configured to receive the viewpoint switch request signal from the user terminal. The content management server further includes a viewing start time determining unit configured to determine a first viewing start time at which the user starts viewing the field-of-view video from the first viewpoint, and a second viewing start time at which the user starts viewing the field-of-view video from the second viewpoint. The content management server further includes a viewing stop time determining unit configured to determine a first viewing stop time at which the user stops viewing the field-of-view video from the first viewpoint, and a second viewing stop time at which the user stops viewing the field-of-view video from the second viewpoint. The content management server further includes a viewing period determining unit configured to determine a first viewing period in which the field-of-view video is viewed from the first viewpoint based on the first viewing start time and the first viewing stop time, and to determine a second viewing period in which the field-of-view video is viewed from the second viewpoint based on the second viewing start time and the second viewing stop time. The content management server further includes a second transmission unit configured to transmit to the user terminal field-of-view video data that is associated with one of the first viewpoint and the second viewpoint.

The content management server is configured to keep transmitting the field-of-view video data that is associated with the first viewpoint at least for a period from a time when the first transmission unit transmits the viewpoint switch request signal to the second transmission unit to a time when the first reception unit receives the field-of-view video data that is associated with the second viewpoint from the content management server, or at least for a period from a time when the second reception unit receives the viewpoint switch request signal to a time when the second transmission unit transmits the field-of-view video data that is associated with the second viewpoint.

The viewing stop time determining unit and the viewing start time determining unit are configured to determine the first viewing stop time and the second viewing start time, respectively, when the second reception unit receives the viewpoint switch request signal.

According to at least one embodiment of this disclosure, providing the video content distribution system capable of improving the degree of satisfaction with the video content distribution service for the user who views the same video content from different viewpoints is possible.

BRIEF DESCRIPTION OF THE DRAWINGS

FIG. 9 is a table of at least one example of a user viewpoint information management table.

FIG. 10 is a table of at least one example of a user viewpoint information management table.

FIG. 11 is a table of at least one example of a content management table.

FIG. 16 is a sequence diagram of a series of processes of the video content distribution system according to at least one embodiment.

Figure 1:
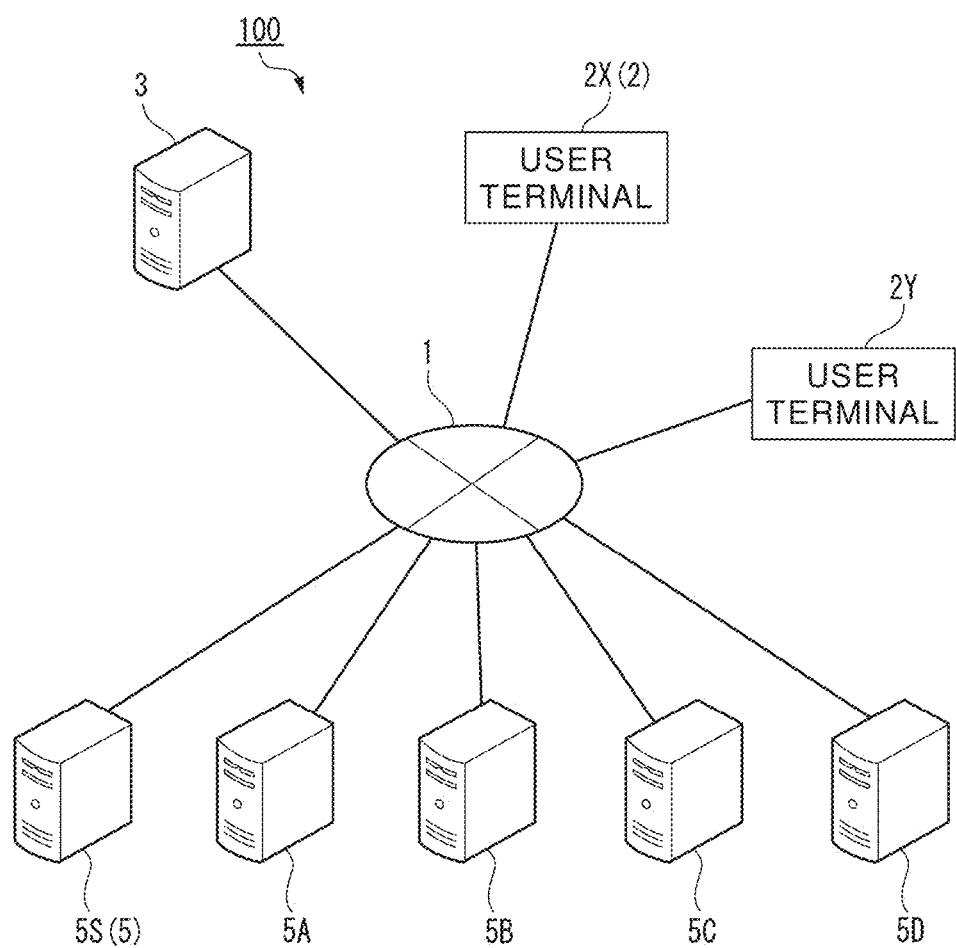
FIG. 1 is a block diagram of a video content distribution system according to some embodiments of this disclosure.

DETAILED DESCRIPTION (1) A video content distribution system includes a user terminal on which contents are viewable and a content management server. The user terminal and the content management server are connected in a manner that allows communication to one another via a communication network. The user terminal includes a first reception unit configured to receive field-of-view video data from the content management server. The user terminal further includes a display control unit configured to display on a display unit a field-of-view video based on the received field-of-view video data. The user terminal further includes a viewpoint switch request signal generating unit configured to generate, in response to input operation performed by a user on the user terminal, a viewpoint switch request signal for requesting a switch from a first viewpoint, which is a current viewpoint, to a second viewpoint in the field-of-view video displayed on the display unit. The user terminal further includes a first transmission unit configured to transmit the generated viewpoint switch request signal to the content management server. The viewpoint switch request signal includes user ID information identifying the user and viewpoint information indicating the second viewpoint. The content management server includes a second reception unit configured to receive the viewpoint switch request signal from the user terminal. The content management server includes a viewing start time determining unit configured to determine a first viewing start time at which the user starts viewing the field-of-view video from the first viewpoint, and a second viewing start time at which the user starts viewing the field-of-view video from the second viewpoint. The content management server further includes a viewing stop time determining unit configured to determine a first viewing stop time at which the user stops viewing the field-of-view video from the first viewpoint, and a second viewing stop time at which the user stops viewing the field-of-view video from the second viewpoint. The content management server further includes a viewing period determining unit configured to determine a first viewing period in which the field-of-view video is viewed from the first viewpoint based on the first viewing start time and the first viewing stop time, and to determine a second viewing period in which the field-of-view video is viewed from the second viewpoint based on the second viewing start time and the second viewing stop time. The content management server further includes a second transmission unit configured to transmit to the user terminal field-of-view video data that is associated with one of the first viewpoint and the second viewpoint. The content management server is configured to keep transmitting the field-of-view video data that is associated with the first viewpoint at least for a period from a time when the first transmission unit transmits the viewpoint switch request signal to the second transmission unit to a time when the first reception unit receives the field-of-view video data that is associated with the second viewpoint from the content management server, or at least for a period from a time when the second reception unit receives the viewpoint switch request signal to a time when the second transmission unit transmits the field-of-view video data that is associated with the second viewpoint. The viewing stop time determining unit and the viewing start time determining unit are configured to determine the first viewing stop time and the second viewing start time, respectively, when the second reception unit receives the viewpoint switch request signal.

According to at least one embodiment of the configuration described above, field-of-view video data that is associated with the first viewpoint is continues being transmitted to the user terminal at least for a period from the time when the first transmission unit transmits the viewpoint switch request signal to the second reception unit to the time when field-of-view video data that is associated with the second viewpoint is received from the content management server, or at least for a period from the time when the second reception unit receives the viewpoint switch request signal to the time when the second transmission unit transmits field-of-view video data that is associated with the second viewpoint.

In this manner, when a switch from the first viewpoint to the second viewpoint is made in a field-of-view image provided to the user terminal, the field-of-view image of the first viewpoint is switched seamlessly to the field-of-view image of the second view point, thereby allowing the user to enjoy viewing the field-of-view image from different viewpoints without being frustrated by a blank image or a buffering signal indicator.

A video content distribution system capable of improving the degree of satisfaction with a video content distribution service for a user who views the same video content from different viewpoints can thus be provided.

In addition, the first viewing period during which a field-of-view image is viewed from the first viewpoint is determined based on the first viewing start time and the first viewing stop time, and the second viewing period during which the field-of-view image is viewed from the second viewpoint is determined based on the second viewing start time and the second viewing stop time. Determining the length of time in which a field-of-view image is viewed for each different viewpoint separately in this manner means that field-of-view video viewing period data can be recorded for each viewpoint and for each user. This viewing period data can be utilized to improve the user's degree of satisfaction with a video content distribution service.

(2) A video content distribution system according to Item (1), in which the content management server further includes a user charge information updating unit configured to update user charge information that is associated with the first viewpoint based on the first viewing period, and to update user charge information that is associated with the second viewpoint based on the second viewing period.

According to at least one embodiment of the configuration described above, user charging information that is associated with the first viewpoint is updated based on the first viewing period, and user charging information that is associated with the second viewpoint is updated based on the second viewing period. A metered-rate charging system that is based on the field-of-view video viewing period of each viewpoint can be provided in this manner, which helps to improve the user's degree of satisfaction with a video content distribution service and to convince the user more that the charge for the service is fair.

(3) A video content distribution system according to Item (1) or (2), in which the content management server further includes a total user charge amount calculating unit configured to determine a total amount to the charged to the user for the viewing of the field-of-view video based on pieces of user charge information that are associated with the respective viewpoints.

According to at least one embodiment of the configuration described above, the total charge amount to be charged to the user for the viewing of a field-of-view video is determined based on pieces of user charge information that are associated with respective viewpoints. A metered-rate charging system that is based on the field-of-view video viewing period of each viewpoint can be provided in this manner, which helps to improve the user's degree of satisfaction with a video content distribution service and to convince the user more that the charge for the service is fair.

(4) A video content distribution system according to any one of Items (1) to (3), in which the content management server further includes a transmission start time determining unit configured to determine a transmission start time at which the second transmission unit starts transmitting the field-of-view video data that is associated with the second viewpoint to the user terminal. The viewing stop time determining unit is configured to determine as the first viewing stop time an acquisition time at which the viewpoint switch request signal is obtained. The viewing start time determining unit is configured to determine as the second viewing start time the transmission start time that is determined by the transmission start time determining unit.

According to at least one embodiment of the configuration described above, an acquisition time at which the viewing stop time determining unit obtains user ID information is determined as the first viewing stop time, and a transmission start time at which the second transmission unit starts transmitting field-of-view video data that is associated with the second viewpoint to the user terminal is determined as the second viewing start time. A period between the acquisition time and the transmission start time is not counted as a field-of-view video viewing period in this manner, which helps to improve the user's degree of satisfaction with a video content distribution service and to convince the user more that the charge for the service is fair.

(5) A video content distribution system according to any one of Items (1) to (3), in which the content management server further includes a transmission start time determining unit configured to determine a transmission start time at which the second transmission unit starts transmitting the field-of-view video data that is associated with the second viewpoint to the user terminal. The content management server further includes a communication delay predicting unit configured to predict a delay in communication between the content management server and the user terminal. The content management server further includes an arrival time predicting unit configured to predict an arrival time at which the field-of-view video data that is associated with the second viewpoint arrives at the user terminal, based on the determined transmission start time and the predicted communication delay. The viewing stop time determining unit is configured to determine as the first viewing stop time an acquisition time at which the viewpoint switch request signal is obtained. The viewing start time determining unit is configured to determine as the second viewing start time the arrival time that is predicted by the arrival time predicting unit.

According to at least one embodiment of the configuration described above, an acquisition time at which the viewing stop time determining unit obtains user ID information is determined as the first viewing stop time, and an arrival time at which the field-of-view video data that is associated with the second viewpoint arrives at the user terminal is determined as the second viewing start time. A period between the acquisition time and the arrival time is not counted as a field-of-view video viewing period in this manner, which helps to improve the user's degree of satisfaction with a video content distribution service and to convince the user more that the charge for the service is fair.

(6) A video content distribution system according to any one of Items (1) to (3), in which the user terminal further includes a time stamp generating unit configured to generate a first time stamp and a second time stamp. The first time stamp indicates a transmission start time at which the first transmission unit starts transmitting the viewpoint switch request signal to the content management server. The second time stamp indicates a display start time at which the display control unit starts displaying on the display unit the field-of-view video from the second viewpoint. The second reception unit is configured to receive the first time stamp and the second time stamp from the user terminal. The viewing stop time determining unit is configured to determine as the first viewing stop time the transmission start time that is indicated by the received first time stamp. The viewing start time determining unit is configured to determine as the second viewing start time the display start time that is indicated by the received second time stamp.

According to at least one embodiment of the configuration described above, a transmission start time indicated by the first time stamp which is when the first transmission unit starts transmitting the viewpoint switch request signal to the content management server is determined as the first viewing stop time, and a display start time indicated by the second time stamp which is when the display control unit starts displaying the field-of-view image from the second viewpoint on the display unit is determined as the second viewing start time. A period between the transmission start time and the display start time is not counted as a field-of-view video viewing period in this manner, which helps to improve the user's degree of satisfaction with a video content distribution service and to convince the user more that the charge for the service is fair.

(7) A content management server, which is connected to a user terminal on which contents are viewable in a manner that allows communication between the user terminal and the content management server via a communication network. The content management server includes a second reception unit configured to receive a viewpoint switch request signal from the user terminal. The content management server further includes a viewing start time determining unit configured to determine a first viewing start time at which a user starts viewing a field-of-view video from a first viewpoint, and a second viewing start time at which the user starts viewing the field-of-view video from a second viewpoint. The content management server further includes a viewing stop time determining unit configured to determine a first viewing stop time at which the user stops viewing the field-of-view video from the first viewpoint, and a second viewing stop time at which the user stops viewing the field-of-view video from the second viewpoint. The content management server further includes a viewing period determining unit configured to determine a first viewing period in which the field-of-view video is viewed from the first viewpoint based on the first viewing start time and the first viewing stop time, and to determine a second viewing period in which the field-of-view video is viewed from the second viewpoint based on the second viewing start time and the second viewing stop time. The content management server further includes a second transmission unit configured to transmit to the user terminal field-of-view video data that is associated with one of the first viewpoint and the second viewpoint. The field-of-view video data that is associated with the first viewpoint is kept transmitted to the user terminal at least for a period from a time when the second reception unit receives the viewpoint switch request signal to a time when the second transmission unit transmits the field-of-view video data that is associated with the second viewpoint. The viewing stop time determining unit and the viewing start time determining unit are configured to determine the first viewing stop time and the second viewing start time, respectively, when the second reception unit receives the viewpoint switch request signal.

According to at least one embodiment of the configuration described above, field-of-view video data that is associated with the first viewpoint is kept transmitted to the user terminal at least for a period from the time when the second reception unit receives the viewpoint switch request signal to the time when the second transmission unit transmits field-of-view video data that is associated with the second viewpoint.

In this manner, when a switch from the first viewpoint to the second viewpoint is made in a field-of-view image provided to the user terminal, the field-of-view image of the first viewpoint is switched seamlessly to the field-of-view image of the second view point, thereby allowing the user to enjoy viewing the field-of-view image from different viewpoints without being frustrated by a blank image or a buffering signal indicator.

A content management server capable of improving the degree of satisfaction with a video content distribution service for a user who views the same video content from different viewpoints can thus be provided.

In addition, the first viewing period during which a field-of-view image is viewed from the first viewpoint is determined based on the first viewing start time and the first viewing stop time, and the second viewing period during which the field-of-view image is viewed from the second viewpoint is determined based on the second viewing start time and the second viewing stop time. Determining the length of time in which a field-of-view image is viewed for each different viewpoint separately in this manner means that field-of-view video viewing period data can be recorded for each viewpoint and for each user. This viewing period data can be utilized to improve the user's degree of satisfaction with a video content distribution service.

Embodiments of this disclosure are described below with reference to the drawings. Once a component is described in this description of embodiments, a description on a component having the same reference number as that of the already described component is omitted for the sake of convenience.

FIG. 1 is a block diagram of a video content distribution system 100 according to some embodiments of this disclosure. As illustrated in FIG. 1, the video content distribution system 100 includes a plurality of user terminals 2X and 2Y, on which video contents can be viewed, a content management server 3, and a plurality of content servers 5S, 5A, 5B, 5C, and 5D. The user terminals 2X and 2Y, the content management server 3, and the content servers 5S, 5A, 5B, 5C, and 5D are connected via a communication network 1, which is a local area network (LAN), a wide area network (WAN), the Internet, or the like, in a manner that allows communication to one another. In the following description, the user terminals 2X and 2Y are simply referred to as "user terminals 2", the content servers 5S, 5A, 5B, 5C, and 5D are simply referred to as "contents servers 5" for the sake of convenience.

Figure 2:
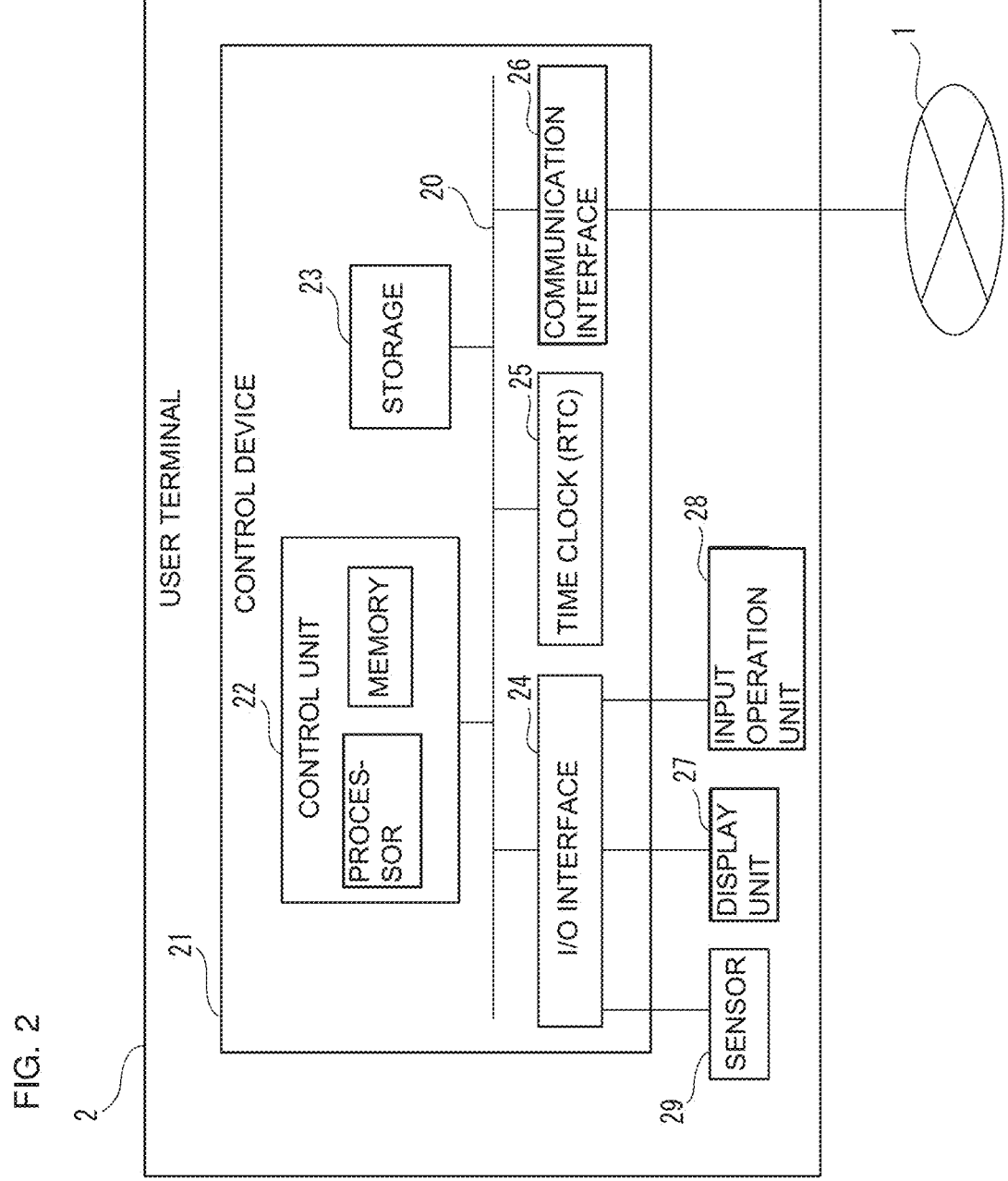
FIG. 2 is a diagram of at least one example of the hardware configuration of a user terminal.

The hardware configuration of the user terminals 2 is described next with reference to FIG. 2. As illustrated in FIG. 2, each user terminal 2 includes a control device 21, an input operation unit 28, a display unit 27, and a sensor 29. The control device 21 includes a communication bus 20, a control unit 22, a storage 23, an input/output (I/O) interface 24, a time clock 25, and a communication interface 26. The control unit 22, the storage 23, the I/O interface 24, the time clock 25, and the communication interface 26 are connected by the communication bus 20 in a manner that allows communication to one another. The control device 21 is, for example, a personal computer, a smartphone, a tablet, or a wearable device.

The control unit 22 includes a memory and a processor. The memory is built from, for example, a read only memory (ROM) on which various programs are able to be stored, or a random access memory (RAM) that has a plurality of work areas where various programs executed by the processor and data are able to be stored. The RAM includes a VRAM on which video data associated with a video that is displayed on the display unit 27 is able to be stored. The processor is built from at least one of a central processing unit (CPU), a micro-processing unit (MPU), a graphic processing unit (GPU), or another processing unit uniquely configured to the tasks of control unit 22.

The storage 23 is configured to store various programs and video data among others, and is built from, for example, a hard disk drive (HDD), a solid state drive (SSD), a flash memory, or the like. The I/O interface 24 is configured to connect the input operation unit 28, the display unit 27, and the sensor 29 to the control device 21 in a manner that allows communication to and from the control device 21. The I/O interface 24 is built from, for example, a universal serial bus (USB) terminal or a High-Definition Multimedia Interface (HDMI®).

The time clock 25 is configured to count the current time and is, for example, a real time clock (RTC). The time clock 25 may synchronize with the time of a device in the network (for example, the content management server) by using the Network Time Protocol (NPT). The communication interface 26 is configured to connect the user terminal 2 to the communication network 1.

The input operation unit 28 is configured to receive input operation from a user of the user terminal 2, and to output an operation signal that indicates the user's input operation in response to the user's input operation. The input operation unit 28 is, for example, a touch panel, an external controller, a mouse, or a keyboard. The display unit 27 is configured to display a field-of-view video associated with field-of-view video data, and is, for example, a head-mounted display (HMD) on which a three-dimensional image is provided to the user. The HMD displays a left-eye image provided to the left eye of the user and a right-eye image provided to the right eye of the user, thereby providing a three-dimensional image that utilizes the parallax between the left and right eyes to the user as a virtual reality (VR) image. The display unit 27 may instead be the display, such as a display of a personal computer, a smartphone, or a tablet.

The sensor 29 is configured to detect the movement of the user wearing the HMD by detecting the HMD's movement in XYZ directions and rotation about XYZ axes. A change in sight line due to the movement of the user's head is detected in this manner. The sensor 29 may be built from at least one of a geomagnetic sensor, an acceleration sensor, or a gyro-sensor that are provided in the HMD, or from an external camera that detects a plurality of light emission points provided in the HMD.

Figure 3:
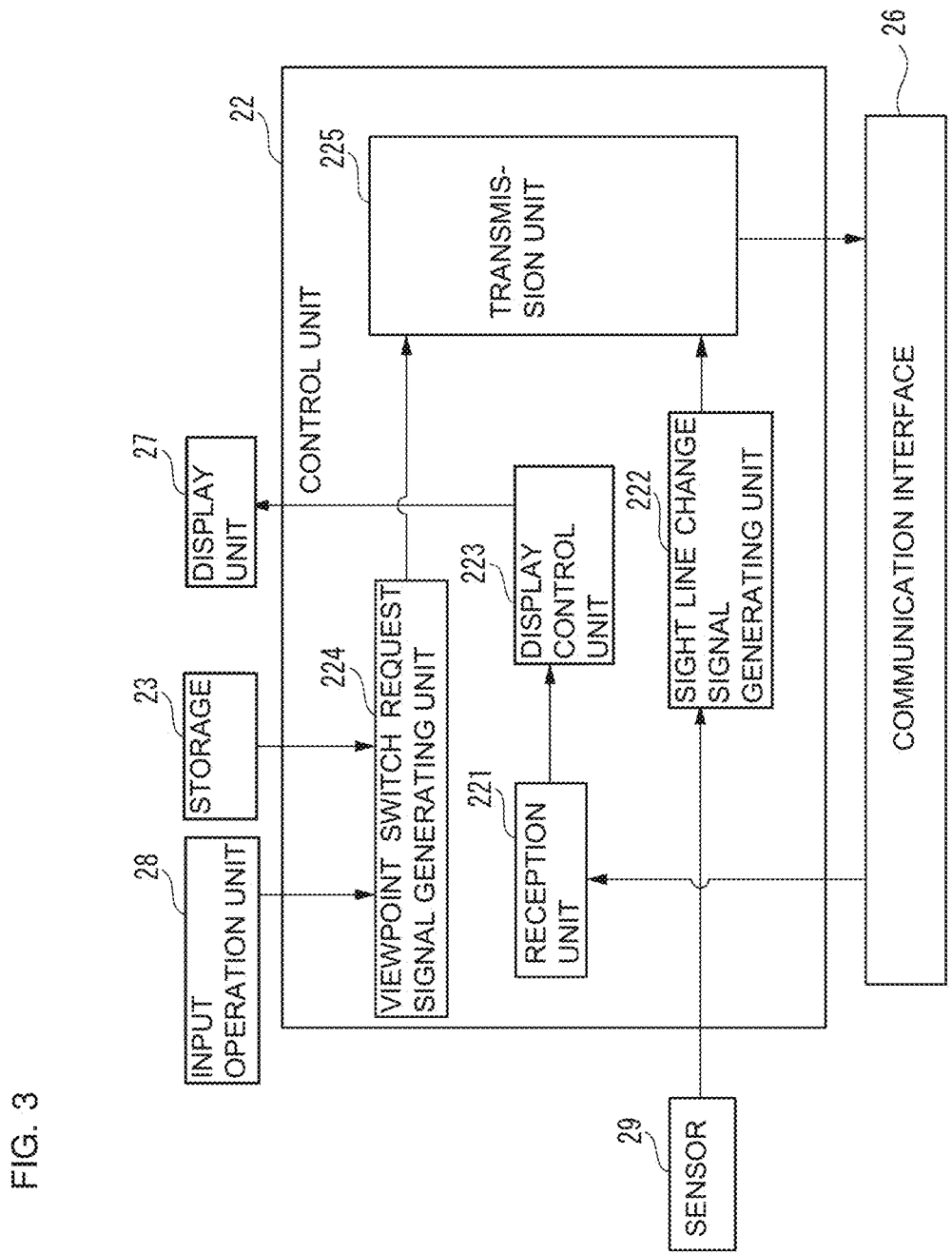
FIG. 3 is a diagram of function blocks of a control unit of the user terminal according to at least one embodiment of this disclosure.

Function blocks including the control unit 22 of the user terminal 2 are described next with reference to FIG. 3. FIG. 3 is a diagram of function blocks of the user terminal 2, including the control unit 22. As illustrated in FIG. 3, the control unit 22 includes a reception unit 221, e.g., a first reception unit, a display control unit 223, a sight line change signal generating unit 222, a viewpoint switch request signal generating unit 224, and a transmission unit 225, e.g., a first transmission unit.

The reception unit 221 is configured to receive field-of-view video data from the content management server 3 via the communication interface 26. The reception unit 221 may receive field-of-view video data in, for example, a streaming format. The reception unit 221 may receive 360-degree space video data that includes field-of-view video data from the content management server 3. In this case, the control unit 22 may generate field-of-view video data from the received 360-degree space video data and from sight line information, which is about the direction of the user's line of sight. The display control unit 223 is configured to generate instructions for displaying a field-of-view video on the display unit 27 based on the received field-of-view video data. In at least one embodiment, a field-of-view video is a virtual reality (VR) video that is displayed within the user's field of view out of a 360-degree space video centered about the user's viewpoint. In other words, a field-of-view video is a part of a 360-degree space video centered about the user's viewpoint, and is defined by the user's field of view. The user's field of view is defined by the direction of the user's line of sight. In at least one embodiment, when the direction of the user's line of sight is determined, the user's field of view is determined and a field-of-view video is determined. Similarly, a change in the direction of the user's line of sight causes a change in the user's field of view, which changes the field-of-view video. Types of field-of-view videos include, for example, concert videos, videos of sports such as soccer, baseball, sumo, and combat sports, and videos of theatrical art such as kabuki, Noh, and musicals.

The sight line change signal generating unit 222 is configured to generate a sight line change signal based on a signal that is output by the sensor 29 to indicate a change in the direction of the user's line of sight. The sight line change signal contains sight line information that is about the changed sight line direction.

Figure 4:
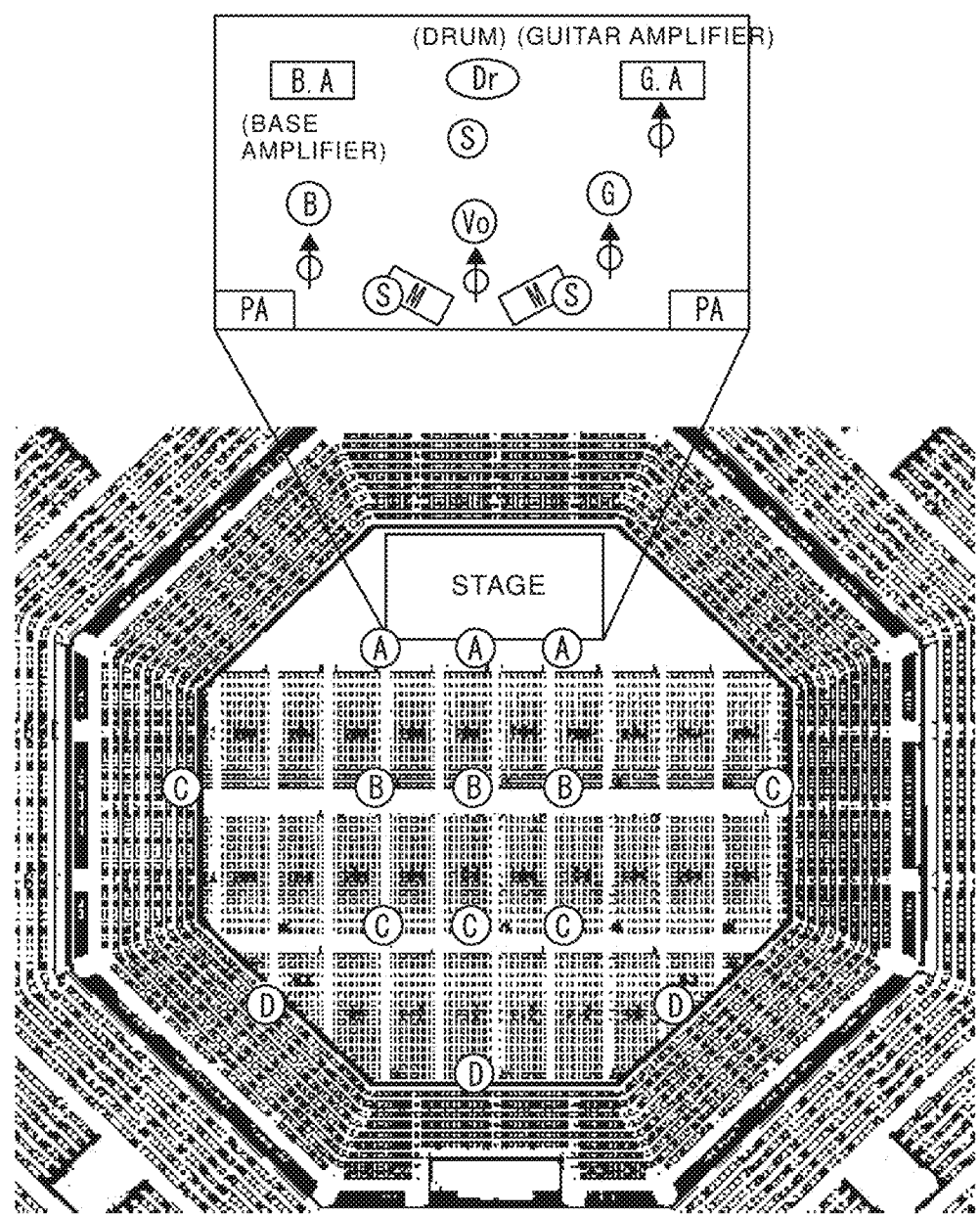
FIG. 4 is a diagram of at least one example of the layout of audience seats in a concert hall.

The viewpoint switch request signal generating unit 224 is configured to generate a viewpoint switch request signal for requesting a switch from the current viewpoint to the next viewpoint in a field-of-view video that is being displayed on the display unit 27 as instructed by input operation received from the user on the user terminal 2. In at least one embodiment, the viewpoint switch request signal generating unit 224 generates sight line information that indicates the line of sight after the switch based on an operation signal, which is output from the input operation unit 28 and which indicates the user's input operation, and reads user ID information of the user who is using the user terminal 2 and address information of the user terminal 2 out of the storage 23. A viewpoint switch request signal thus contains sight line information, user ID information, and address information of the user terminal 2. Viewpoints in a field-of-view video correspond to, for example, viewpoints from an S-seat area, an A-seat area, a B-seat area, a C-seat area, or a D-seat area in a concert hall as illustrated in FIG. 4. A viewpoint in the S-seat area is a viewpoint from a stage on which artists perform. For instance, the viewpoint switch request signal generating unit 224 generates a viewpoint switch request signal for requesting a switch from an A-seat area viewpoint, which is the current viewpoint, to an S-seat area viewpoint, which is the next viewpoint, in a field-of-view video displayed on the display unit 27. User ID information of a user is, for example, a member ID that the user enters to use a video content distribution service. Address information of the user terminal 2 is, for example, the IP address of the user terminal 2. The viewpoint switch request signal generating unit 224 may also generate a viewpoint switch request signal for requesting a switch from one viewpoint in a seat area, e.g. the S-seat area, to another point in the same seat area, e.g. the same S-seat area, in a field-of-view video displayed on the display unit 27.

The transmission unit 225 is configured to transmit, to the content management server 3, via the communication interface 26, a viewpoint switch request signal generated by the viewpoint switch request signal generating unit 224 and a sight line change signal generated by the sight line change signal generating unit 225. In at least one embodiment where the user terminal 2 receives 360-degree space video data from the content management server 3, the sight line change signal is not transmitted to the content management server 3.

Figure 5:
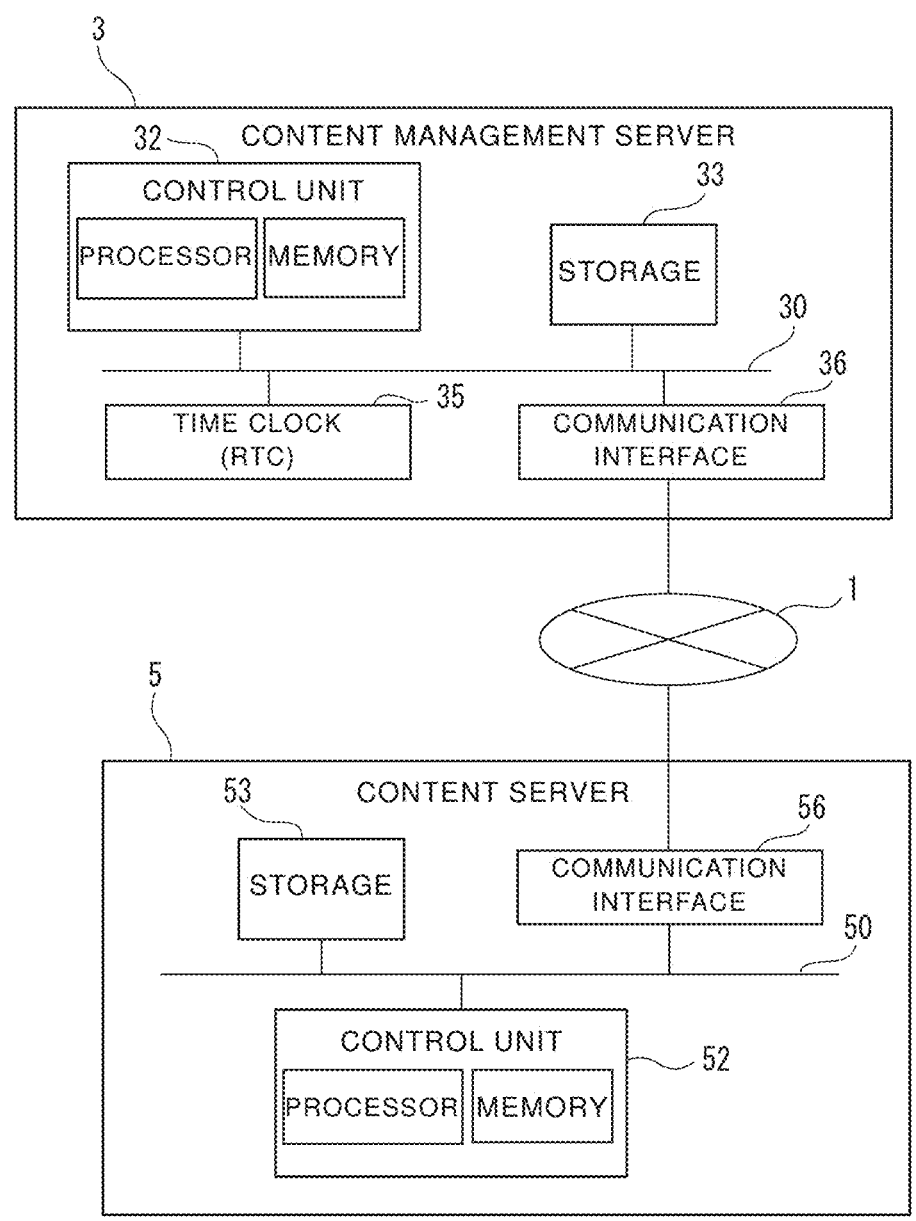
FIG. 5 is a diagram of at least one example of the hardware configurations of a content management server and content servers.

The hardware configuration of the content management server 3 and the hardware configuration of the content servers 5 are described next with reference to FIG. 5. FIG. 5 is a diagram of at least one example of the hardware configurations of the content management server 3 and the content servers 5. As illustrated in FIG. 5, the content management server 3 includes a communication bus 30, a control unit 32, a storage 33, a time clock 35, and a communication interface 36. The control unit 32, the storage 33, the time clock 35, and the communication interface 36 are connected via the communication bus 30 in a manner that allows communication to one another. The control unit 32 includes a memory and a processor. The memory is built from, for example, a ROM or a RAM. The processor is built from, for example, at least one of a CPU, an MPU, a GPU or another processing unit uniquely configured to the tasks of control unit 32.

The storage 33 is configured to store various programs and video data among others, and is built from, for example, HDD, SSD, a flash memory, or the like. The time clock 35 has the same configuration as that of the already described time clock 25, and may synchronize with the time of the user terminal and others by using the NTP. The communication interface 36 is configured to connect the content management server 3 to the communication network 1.

The content server 5 includes a communication bus 50, a control unit 52, a storage 53, and a communication interface 56. The control unit 52, the storage 53, and the communication interface 56 are connected via the communication bus 50 in a manner that allows communication to one another.

The control unit 52 includes a memory and a processor. The memory is built from, for example, a ROM and a RAM. The processor is built from, for example, at least one of a CPU, an MPU, a GPU or another processing unit uniquely configured to the tasks of control unit 52.

The storage 53 is built from, for example, a large-capacity HDD, and is configured to store 360-degree space video data associated with viewpoints. For example, the storage 53 of the content server 5S is configured to store 360-degree space video data that is associated with a viewpoint in the S-seat area. The storage 53 of the content server 5A is configured to store 360-degree space video data that is associated with a viewpoint in the A-seat area. The storage 53 of the content server 5B is configured to store 360-degree space video data that is associated with a viewpoint in the B-seat area. The storage 53 of the content server 5C is configured to store 360-degree space video data that is associated with a viewpoint in the C-seat area. The storage 53 of the content server 5D is configured to store 360-degree space video data that is associated with a viewpoint in the D-seat area. The 360-degree space video data of each seat area may be picked up by a 360-degree camera set up in the concert hall. For example, a 360-degree space video is taken by a 360-degree camera that is set up in the S-seat area (the stage on which artists perform). The 360-degree space video data picked up by the 360-degree camera is then stored in the storage 53 of the content server 5S. In at least one embodiment, where the video content distribution system 100 is intended for a user who views the same video content from different viewpoints, pieces of 360-degree space video data stored on the respective content servers 5S, 5A, 5B, 5C, and 5D are of the same video content (for example, the same concert video).

While pieces of 360-degree space video data associated with different viewpoints are stored separately on the plurality of content servers 5 (5S, 5A, 5B, 5C, and 5D) in at least one embodiment, one content server 5 may store pieces of 360-degree space video data of a plurality of viewpoints. The communication interface 56 of each content server 5 is configured to connect the content server 5 to the communication network 1.

Figure 6:
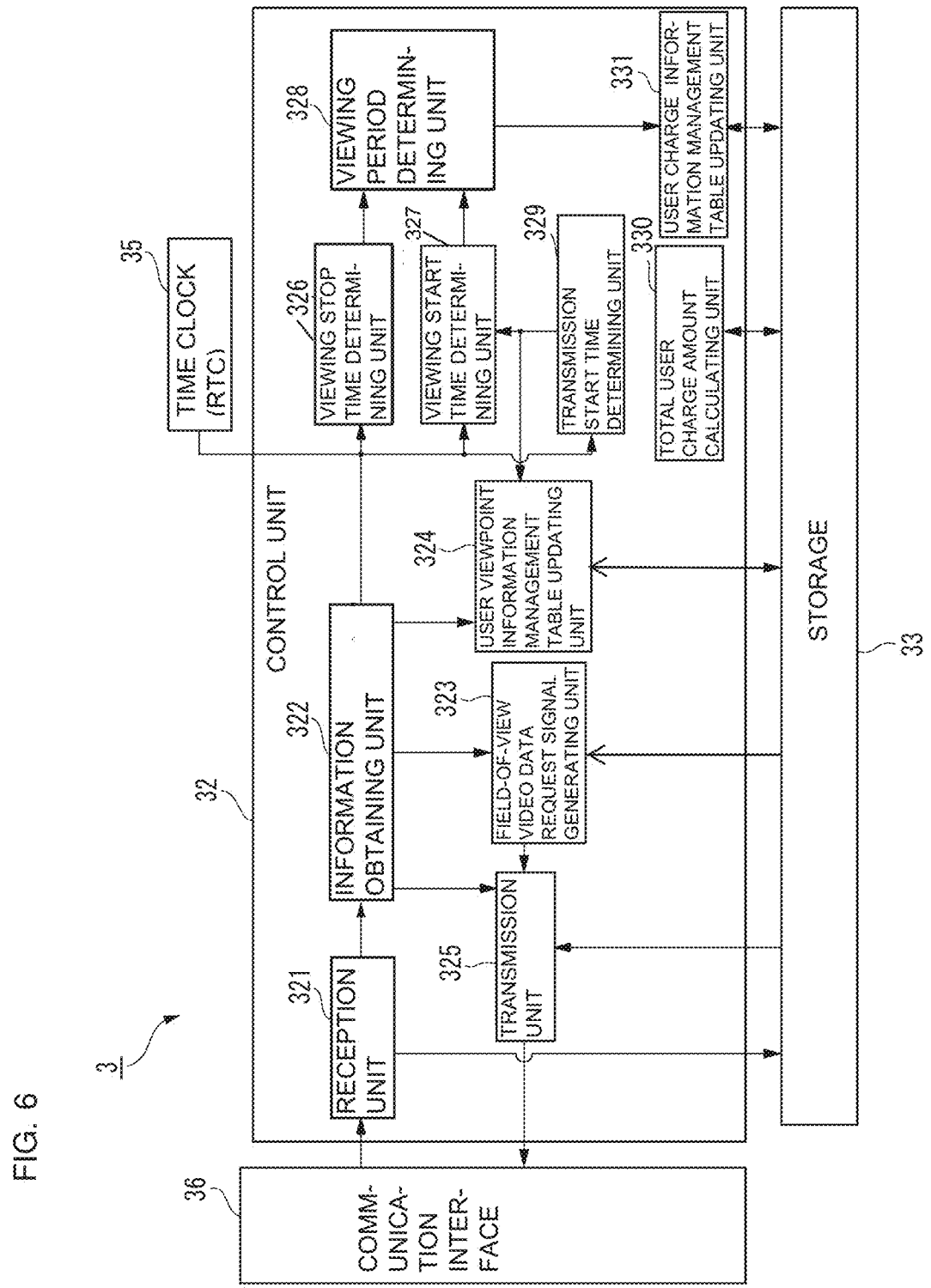
FIG. 6 is a diagram of function blocks of a control unit of the content management server according to at least one embodiment.

Function blocks of the control unit 32 of the content management server 3 according to at least one embodiment are described next with reference to FIG. 6. FIG. 6 is a diagram of function blocks of the control unit 32 of the content management server 3 according to at least one embodiment of this disclosure. As illustrated in FIG. 6, the control unit 32 includes a reception unit 321, e.g. a second reception unit, an information obtaining unit 322, a viewing stop time determining unit 326, a viewing start time determining unit 327, a viewing period determining unit 328, a transmission start time determining unit 329, a user charge information management table updating unit 331, e.g. a user charge information updating unit, a total user charge amount calculating unit 330, a user viewpoint information management table updating unit 324, a field-of-view video data request signal generating unit 323, and a transmission unit 325, e.g. a second transmission unit.

The reception unit 321 is configured to receive a viewpoint switch request signal and a sight line change signal from the user terminal 2 via the communication interface 36. The reception unit 321 is also configured to receive field-of-view video data from the content servers 5 via the communication interface 36. The information obtaining unit 322 is configured to obtain user ID information, user viewpoint information, and address information of the user terminal 2 from the viewpoint switch request signal received by the reception unit 321. The information obtaining unit 322 is also configured to obtain sight line information about a changed sight line direction, based on the sight line change signal received by the reception unit 321.

The viewing stop time determining unit 326 is configured to determine a viewing stop time at which the user stops viewing a field-of-view video from the current viewpoint (for example, a viewpoint in the A-seat area). The viewing start time determining unit 327 is configured to determine a viewing start time at which the user starts viewing the field-of-view video from the current viewpoint (for example, a viewpoint in the A-seat area). The viewing period determining unit 328 is configured to determine the length of time in which the field-of-view video is viewed from the current viewpoint (for example, a viewpoint in the A-seat area), based on the viewing start time determined by the viewing start time determining unit 327 and the viewing stop time determined by the viewing stop time determining unit 326.

The transmission start time determining unit 329 is configured to determine a transmission start time at which the transmission unit 325 starts transmitting to the user terminal 2 field-of-view video data that is associated with a post-switch viewpoint (for example, a viewpoint in the S-seat area). The user charge information management table updating unit 331 is configured to update data in a user charge information management table (see FIG. 10), which is stored in the storage 33. In particular, the user charge information management table updating unit 331 is configured to update the accumulated viewing period (an example of user charge information) of viewing from the current viewpoint based on how long the field-of-view video has been viewed from the current viewpoint which is determined by the viewing period determining unit 328.

The total user charge amount calculating unit 330 is configured to determine the total amount to be charged to the user for the viewing of a field-of-view video, based on accumulated viewing periods, e.g. at least one example of user charge information, that are associated with the respective viewpoints shown in FIG. 10, e.g. the S-seat area to the D-seat area.

As shown in FIG. 10, the user charge information management table includes, for each user, pieces of information about per-unit time fees associated with the respective viewpoints, e.g. seat areas, pieces of information about accumulated viewing periods associated with the respective viewpoints, charge amounts associated with the respective viewpoints, and the total amount to be charged to the user for the viewing of a field-of-view video. In at least one embodiment, each user is identified based on a user ID. In at least one example of the user charge information management table of FIG. 10, an amount charged for the viewing of a field-of-view video from a view point in the S-seat area is calculated as 333 yen by 1,000 yen/time×20 minutes/60 minutes. For each user ID, the total amount to be charged to the user ID is calculated by adding up charge amounts that are associated with the respective viewpoints. In at least one example of FIG. 10, the total charge amount is calculated as 667 yen by 333 yen (S seat)+133 yen (A seat)+58 yen (B seat)+42 yen (C seat)+100 yen (D seat).

The user viewpoint information management table updating unit 324 is configured to update data in a user viewpoint information management table (see FIG. 9), which is stored in the storage 33. In particular, the user viewpoint information management table updating unit 324 adds, for each user, a viewpoint associated with the user (for example, the S-seat area) and a transmission start time of the viewpoint (for example, 00:03) to the user viewpoint information management table, based on a transmission start time that is determined by the transmission start time determining unit 329 and on the user's viewpoint information obtained by the information obtaining unit 322. In the case where the user's viewpoint switches from a viewpoint in the A-seat area to a viewpoint in the S-seat area, for example, the viewpoint in the S-seat area and the transmission start time of the viewpoint are newly written in the user viewpoint information management table.

The field-of-view video data request signal generating unit 323 is configured to generate a field-of-view video data request signal for requesting field-of-view video data. In particular, the field-of-view video data request signal generating unit 323 is configured to read a post-switch viewpoint by referring to the user viewpoint information management table (see FIG. 9), which is stored in the storage 33. The field-of-view video data request signal generating unit 323 may calculate a play start time at which the field-of-view video, based on the field-of-view video data, is played from the post-switch viewpoint, based on, for example, information that is written in the user viewpoint information management table. The field-of-view video data request signal generating unit 323 may also obtain address information (for example, an IP address) of the content server 5 that is associated with the post-switch viewpoint from a content management table (see FIG. 11), which is stored in the storage 33. A field-of-view video data request signal may thus contain address information of the post-switch viewpoint and information about a play start time at which the field-of-view video is played from the post-switch viewpoint. The field-of-view video request signal may further contain sight line information about the changed sight line direction which is obtained by the information obtaining unit 322. The field-of-view video data request signal may contain sight line information about the initial sight line direction (for example, a direction toward the center of the stage) instead of sight line information about the changed sight line direction.

The transmission unit 325 is configured to transmit a field-of-view video data request signal generated by the field-of-view video data request signal generating unit 323 to a desired content server 5 via the communication interface 36 and the communication network 1. In particular, the transmission unit 325 may transmit the field-of-view video data request signal by referring to address information of the post-switch viewpoint that is contained in the field-of-view video data request signal. The transmission unit 325 may transmit field-of-view video obtained from the content server 5 to the user terminal 2. The transmission unit 325 may also transmit 360-degree space video data obtained from the content server 5 that includes field-of-view video data to the user terminal 2. In at least one embodiment, the user terminal 2 generates field-of-view video data from the 360-degree space video data.

Figure 7:
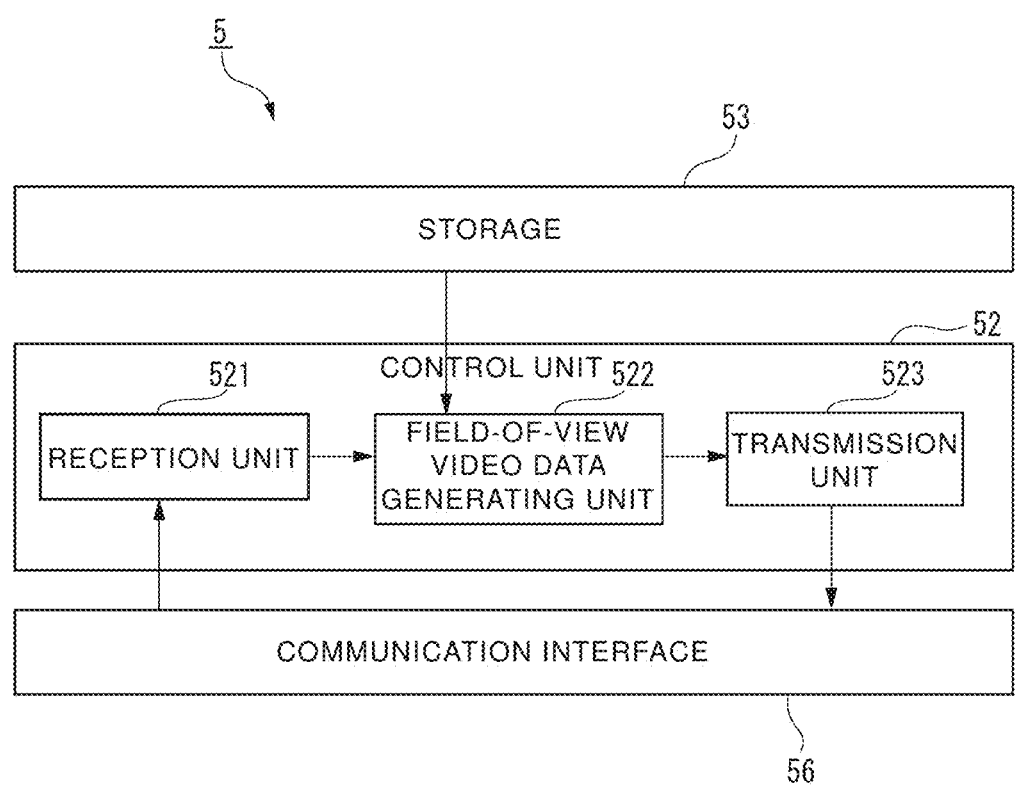
FIG. 7 is a diagram of function blocks of a control unit of each content server according to at least one embodiment.

Function blocks of the control unit 52 of each content server 5 are described next with reference to FIG. 7. FIG. 7 is a diagram of function blocks of the control unit 52 of each content server 5. As illustrated in FIG. 7, the control unit 52 includes a reception unit 521, a field-of-view video data generating unit 522, and a transmission unit 523. The reception unit 521 is configured to receive a field-of-view video data request signal transmitted from the content management server 3. The field-of-view video data generating unit 522 is configured to generate, after reading 360-degree space video data out of the storage 53, field-of-view video data based on the read 360-degree space video data and on the received field-of-view video data request signal. In the case of the content server 5S, for example, the field-of-view video data generating unit 522 reads 360-degree space video data that is associated with a viewpoint in the S-seat area out of the storage 53, and then generates field-of-view video data that is associated with the viewpoint in the S-seat area based on the read 360-degree space video data and on the received field-of-view video data request.

The transmission unit 523 is configured to transmit the field-of-view video data generated by the field-of-view video data generating unit 522 to the content management server 3 via the communication interface 56. The transmission unit 523 may transmit 360-degree space video data that includes field-of-view video data to the content management server 3. In at least one embodiment, the 360-degree space video data is transmitted from the content management server 3 to the user terminal 2, where field-of-view video data is generated from the 360-degree space video data.

Figure 8:
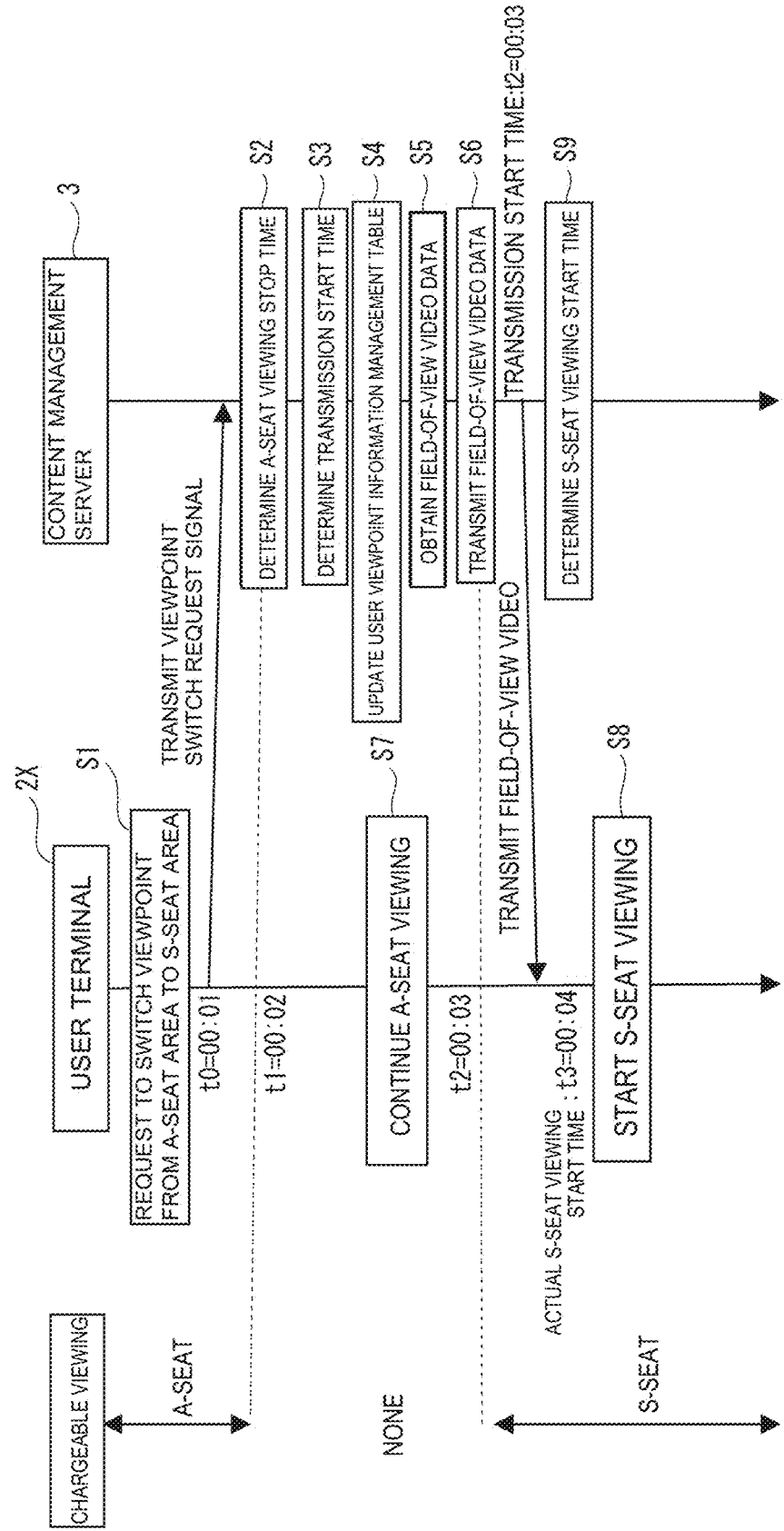
FIG. 8 is a sequence diagram of a series of processes of the video content distribution system according to at least one embodiment.

A series of processes of the video content distribution system 100 according to at least one embodiment is described next with reference to FIG. 8. FIG. 8 is a sequence diagram of a series of processes of the video content distribution system 100 according to at least one embodiment. The description given here focuses on exchanges of information between the user terminal 2X, which is used by a user X, and the content management server 3 as illustrated in FIG. 8, to thereby describe a charging method of the video content distribution system 100. One of ordinary skill in the art would understand that in at least one embodiment exchanges of information between the user terminal 2Y, which is used by a user Y, and the content management server 3 are similar to the exchanges of information between the user terminal 2X and the content management server 3.

In Step S1, the user X performs, through the input operation unit 28, given operation for switching from a viewpoint in the A-seat area (a first viewpoint), which is a pre-switch viewpoint, to a viewpoint in the S-seat area (a second viewpoint), which is a post-switch viewpoint. In other words, the input operation unit 28 transmits to the viewpoint switch request signal generating unit 224 an operation signal that indicates a request for a switch from the viewpoint in the A-seat area to the viewpoint in the S-seat area. As requested by the operation signal transmitted from the input operation unit 28, the viewpoint switch request signal generating unit 224 generates a viewpoint switch request signal for requesting a switch from the viewpoint in the A-seat area to the viewpoint in the S-seat area in a field-of-view video that is being displayed on the display unit 27. In at least one embodiment, the viewpoint switch request signal generating unit 224 generates viewpoint information that indicates the viewpoint in the S-seat area based on the operation signal transmitted from the input operation unit 28, and reads user ID information of the user X and address information of the user terminal 2X out of the storage 23. The viewpoint switch request signal thus contains the viewpoint information that indicates the viewpoint in the S-seat area, the user ID information of the user X, and the IP address information of the user terminal 2X.

Next, the transmission unit 225 transmits the generated viewpoint switch request signal to the content management server 3 via the communication interface 26. The time at which the user terminal 2X transmits the viewpoint switch request signal is t0=00:01 as illustrated in FIG. 8.

In Step S2, the viewing stop time determining unit 326 refers to the current time on the time clock 35 and information obtained by the information obtaining unit 322, to thereby determine an A-seat viewing stop time (a first viewing stop time) at which the user X stops viewing the field-of-view video from the viewpoint in the A-seat area (the first viewpoint). In at least one embodiment, the viewing stop time determining unit 326 determines as the A-seat viewing stop time a time at which the viewpoint switch request signal (information contained in the viewpoint switch request signal, to be exact) is obtained. The viewing stop time is t1=00:02 as illustrated in FIG. 8.

Prior to Step S1, the viewing start time determining unit 327 has determined an A-seat viewing start time (a first viewing start time) at which the user X starts viewing the field-of-view video from the viewpoint in the A-seat area (the first viewpoint). In at least one embodiment, the viewing stop time determining unit 236 does not need to operate (in other words, does not need to determine the A-seat viewing stop time) in the case where a viewpoint switch request signal received by the reception unit 321 is a request for a switch from one viewpoint in the A-seat area to another viewpoint in the A-seat area (i.e., when the received viewpoint switch request signal is a request for a switch between viewpoints in the same seat area). In such cases, where the viewpoint is switched within the same seat area, the viewpoint start time determining unit 327 does not need to operate either.

In this manner, when the viewpoint switch request signal received by the reception unit 321 is a request for a switch from the first viewpoint that belongs to a given seat area to the second viewpoint that belongs to a seat area different from the given seat area in a field-of-view video displayed on the display unit 27 (or when the viewpoint switch request signal transmitted from the transmission unit 225 is this request), the viewing stop time determining unit 326 determines the first viewing stop time at which the viewing of the field-of-view video from the first viewpoint is stopped and the viewing start time determining unit 327 determines a second viewing start time at which the viewing of the field-of-view video from the second viewpoint is started.

Next, the transmission start time determining unit 329 determines in Step S3 a transmission start time at which the transmission unit 325 starts transmitting field-of-view video data that is associated with the viewpoint in the S-seat area to the user terminal 2X, by referring to the current time on the time clock 35 and information obtained by the information obtaining unit 322. The transmission start time is t2=00:03.

In Step S4, the user viewpoint information management table updating unit 324 updates data in the user viewpoint information management table (see FIG. 9), which is stored in the storage 33. In particular, the user viewpoint information management table updating unit 324 writes in the user viewpoint information management table the transmission start time t2=00:03 determined by the transmission start time determining unit 329, the user ID information of the user X that is obtained by the information obtaining unit 322, and the viewpoint information indicating the viewpoint in the S-seat area that is obtained by the information obtaining unit 322.

In Step S5, the content management server 3 obtains field-of-view video data that is associated with the viewpoint in the S-seat area from the content server 5S, where 360-degree space video data that is associated with the viewpoint in the S-seat area is stored. In at least one embodiment, the field-of-view video data request signal generating unit 323 generates a field-of-view video data request signal for requesting field-of-view video data. In at least one embodiment, the field-of-view video data request signal generating unit 323 reads the viewpoint in the S-seat area by referring to the user viewpoint information management table (see FIG. 9), which is stored in the storage 33. The field-of-view video data request signal generating unit 323 further calculates a play start time at which the field-of-view video is played from the viewpoint in the S-seat area, based on information that is written in the user viewpoint information management table, and obtains address information of the content server 5S from the content management table (see FIG. 11), which is stored in the storage 33. The field-of-view video data request signal may thus contain the address information of the content server 5S and information about the play start time at which the field-of-view video is played from the viewpoint in the S-seat area. The field-of-view video data request signal may contain sight line information about the initial sight line direction (for example, a direction toward the center of the stage) when the viewpoint of the field-of-view video is switched.

Next, the transmission unit 325 refers to the address information of the content server 5S, to thereby transmit the field-of-view video data request signal generated by the field-of-view video data request signal generating unit 323 to the content server 5S via the communication interface 36 and the communication network 1. The content server 5S receives the field-of-view video data request signal, and then generates field-of-view video data that is associated with the viewpoint in the S-seat area based on the field-of-view video data request signal. The content server 5S transmits the generated field-of-view video data to the content management server 3. In at least one embodiment, the reception unit 521 of the content server 5S receives the field-of-view video data request signal, and the field-of-view video data generating unit 522 then reads 360-degree space video data that is associated with the viewpoint in the S-seat area out of the storage 53. The field-of-view video data generating unit 522 generates field-of-view video data that is associated with the viewpoint in the S-seat area based on the read 360-degree space video data and on the received field-of-view video data request signal. The transmission unit 523 transmits the generated field-of-view video data to the content management server 3 via the communication interface 56. The content management server 3 receives 360-degree space video data that is associated with the viewpoint in the S-seat area from the content server 5S in this manner.

Next, the content management server 3 transmits in Step S6 the field-of-view video data that is associated with the viewpoint in the S-seat area to the user terminal 2X. Specifically, the transmission unit 325 refers to the transmission start time stored in the user viewpoint information management table (t2=00:03) and the address information of the user terminal 2X that is obtained by the information obtaining unit 322, to thereby transmit the field-of-view video data that is associated with the viewpoint in the S-seat area and that is stored in the storage 33 to the user terminal 2X in a streaming format. The content management server 3, which transmits the field-of-view video data to the user terminal 2X in at least one embodiment, may instead transmit to the user terminal 2X the 360-degree space video data that includes the field-of-view video data.

During a period from the time when the transmission unit 225 of the user terminal 2X transmits the viewpoint switch request signal to the reception unit 321 of the content management server 3 (t0=00:01) to the time when the reception unit 221 of the user terminal 2X receives the field-of-view video data that is associated with the viewpoint in the S-seat area (the second viewpoint) from the content management server 3, the content management server 3 (the transmission unit 325) keeps transmitting field-of-view video data that is stored in the storage 33 as data associated with the viewpoint in the A-seat area (the first viewpoint), which is the pre-switch viewpoint, to the user terminal 2X in a streaming format. Alternatively, in at least one embodiment, the content management server 3 (the transmission unit 325) keeps transmitting field-of-view video data that is stored in the storage 33 as data associated with the viewpoint in the A-seat area (the first viewpoint), which is the pre-switch viewpoint, to the user terminal 2X in a streaming format during a period from the time when the reception unit 321 of the content management server 3 receives the viewpoint switch request signal from the user terminal 2X to the time when the transmission unit 325 of the content management server 3 transmits the field-of-view video data that is associated with the viewpoint in the S-seat area (the second viewpoint) to the user terminal 2X.

This allows the user X to keep viewing the field-of-view video from the viewpoint in the A-seat area during the period described above, as shown in Step S7. After a given length of time elapses (t3=00:04) since the time when the user terminal 2X receives the field-of-view video data that is associated with the viewpoint in the S-seat area, the display control unit 223 displays a field-of-view video from the viewpoint in the S-seat area on the display unit 27 based on the field-of-view video data that is associated with the viewpoint in the S-seat area (Step S8). This allows the user X to view the field-of-view video that is associated with the viewpoint in the S-seat area from t3=00:04 on.

In this manner, when viewpoint switching operation for switching from a viewpoint in the A-seat area (the first viewpoint) to a viewpoint in the S-seat area (the second viewpoint) is performed on a field-of-view video provided to the user terminal 2X, the field-of-view video from the viewpoint in the A-seat area is switched seamlessly to the field-of-view video from the viewpoint in the S-seat area, thereby allowing the user X to enjoy viewing the field-of-view image from different viewpoints without being frustrated by a blank image or a buffering icon. The video content distribution system 100 and the content management server 3 that are provided in this embodiment are thus capable of improving the degree of satisfaction with a video content distribution service for a user who views the same video content from different viewpoints.

Next, the viewing start time determining unit 327 determines in Step S9 an S-seat viewing start time (the second viewing start time) at which the user X starts viewing the field-of-view video from the viewpoint in the S-seat area, i.e., the post-switch viewpoint. In at least one embodiment, the viewing start time determining unit 327 determines as the S-seat viewing start time the transmission start time determined by the transmission start time determining unit 329 (t2=00:03). For example, when the content management server 3 (the reception unit 321) receives after this step a viewpoint switch request signal that requests a switch of the viewpoint of the field-of-view video from the viewpoint in the S-seat area to a viewpoint in the B-seat area, the viewing stop time determining unit 326 determines an S-seat viewing stop time (the second viewing stop time) at which the user X stops viewing the field-of-view video from the viewpoint in the S-seat area (the second viewpoint). In at least one embodiment, the viewing stop time determining unit 326 determines as the S-seat viewing stop time an acquisition time at which the viewpoint switch request signal is obtained.

When the content management server 3 (the reception unit 321) receives the viewpoint switch request signal, the viewing stop time determining unit 326 determines the A-seat viewing stop time and the viewing start time determining unit 237 determines the S-seat viewing start time as already described.

The viewing period determining unit 328 determines an A-seat viewing period (a first viewing period) in which the field-of-view video is viewed from the viewpoint in the A-seat area, based on the A-seat viewing start time (the first viewing start time) and the A-seat viewing stop time (the first viewing stop time). Specifically, the viewing period determining unit 328 calculates the A-seat viewing period from the difference between the A-seat viewing stop time and the A-seat viewing start time (A-seat viewing stop time−A-seat viewing start time).

Similarly, the viewing period determining unit 328 determines an S-seat viewing period (a second viewing period) in which the field-of-view video is viewed from the viewpoint in the S-seat area, based on the S-seat viewing start time (the second viewing start time) and the S-seat viewing stop time (the second viewing stop time). In at least one embodiment, the viewing period determining unit 328 calculates the S-seat viewing period from the difference between the S-seat viewing stop time and the S-seat viewing start time (S-seat viewing stop time−S-seat viewing start time).

According to at least one embodiment, the A-seat viewing period is determined based on the A-seat viewing start time and the A-seat viewing stop time and the S-seat viewing period is determined based on the S-seat viewing start time and the S-seat viewing stop time in this manner. The length of time in which a field-of-view video is viewed is determined for each viewpoint separately, and thus field-of-view video viewing period data can be recorded for each viewpoint and for each user, and the viewing period data can be used to improve the user's degree of satisfaction with a video content distribution service.

In addition, the user charge information management table updating unit 331 updates the accumulated viewing period (user charge information) that is associated with the viewpoint in the A-seat area based on the A-seat viewing period, and updates the accumulated viewing period (user charge information) that is associated with the viewpoint in the S-seat area based on the S-seat viewing period (see FIG. 10). According to at least one embodiment, a metered-rate charging system that is based on the field-of-view video viewing period of each viewpoint can be provided in this manner, which helps to improve the user's degree of satisfaction with a video content distribution service.

In addition, the total user charge amount calculating unit 330 determines the total amount to be charged to the user X (667 yen in FIG. 10) for the viewing of a field-of-view video based on accumulated viewing periods (user charge information) that are associated with the respective viewpoints (the S-seat area to the D-seat area). A metered-rate charging system that is based on the field-of-view video viewing periods of the respective viewpoints (the S-seat area to the D-seat area) can be provided in this manner, which helps to improve the user's degree of satisfaction with a video content distribution service and to convince the user more that the charge for the service is fair.

According to at least one embodiment, the viewing stop time determining unit 326 determines as the A-seat viewing stop time an acquisition time at which a viewpoint switch request signal (in particular, information contained in a viewpoint switch request signal, for example, user ID information) is obtained (t1=00:02), and a transmission start time at which the transmission unit 325 starts transmitting field-of-view video data that is associated with the viewpoint in the S-seat area to the user terminal 2X (t2=00:03) is determined as the S-seat viewing start time. The period between the acquisition time t1 and the transmission start time t2 (1 second) is not counted as a field-of-view video viewing period in this manner, which helps to improve the user's degree of satisfaction with a video content distribution service and to convince the user more that the charge for the service is fair.

Figure 12:
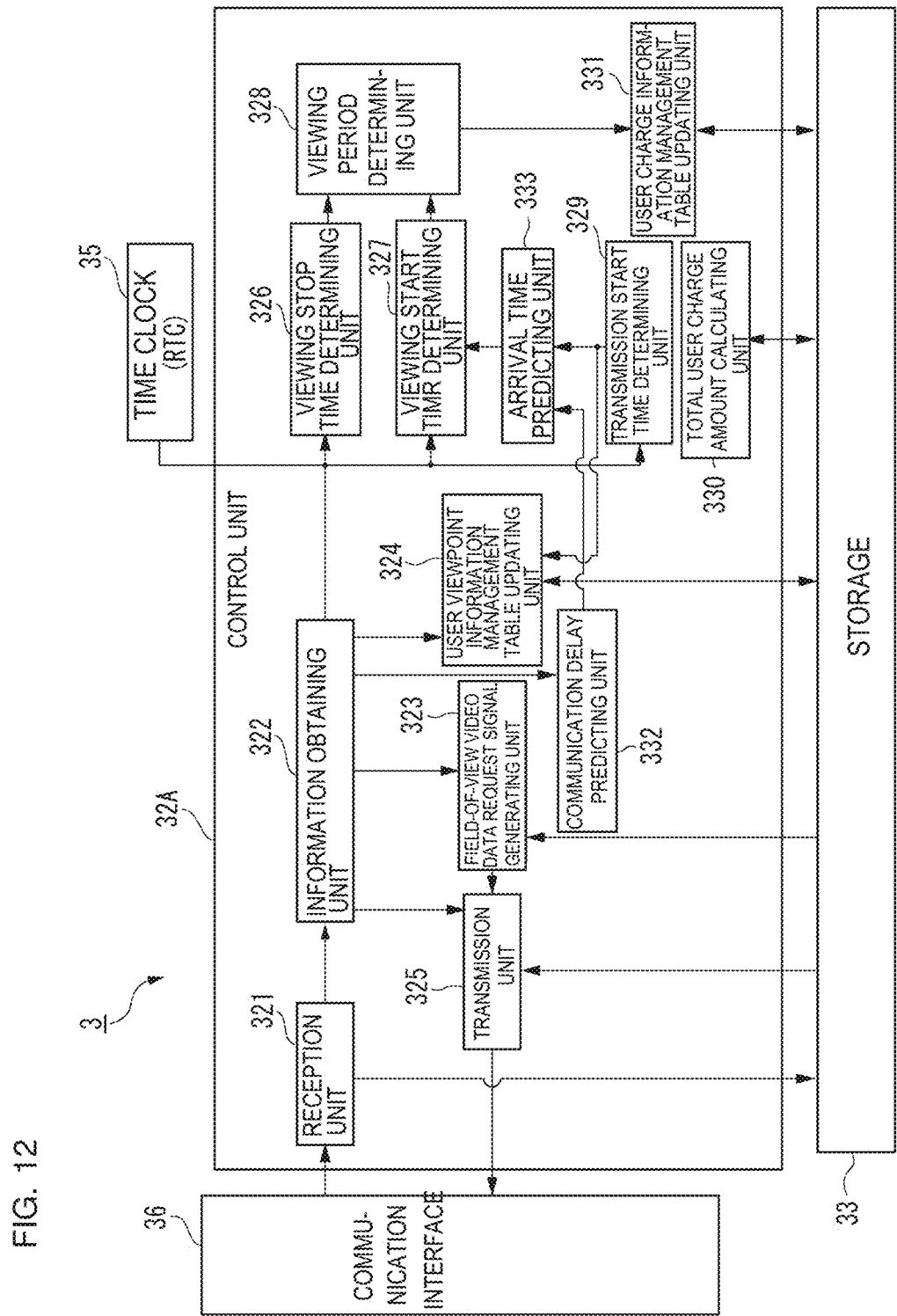
FIG. 12 is a diagram of function blocks of a control unit of the content management server according to at least one embodiment.
Figure 13:
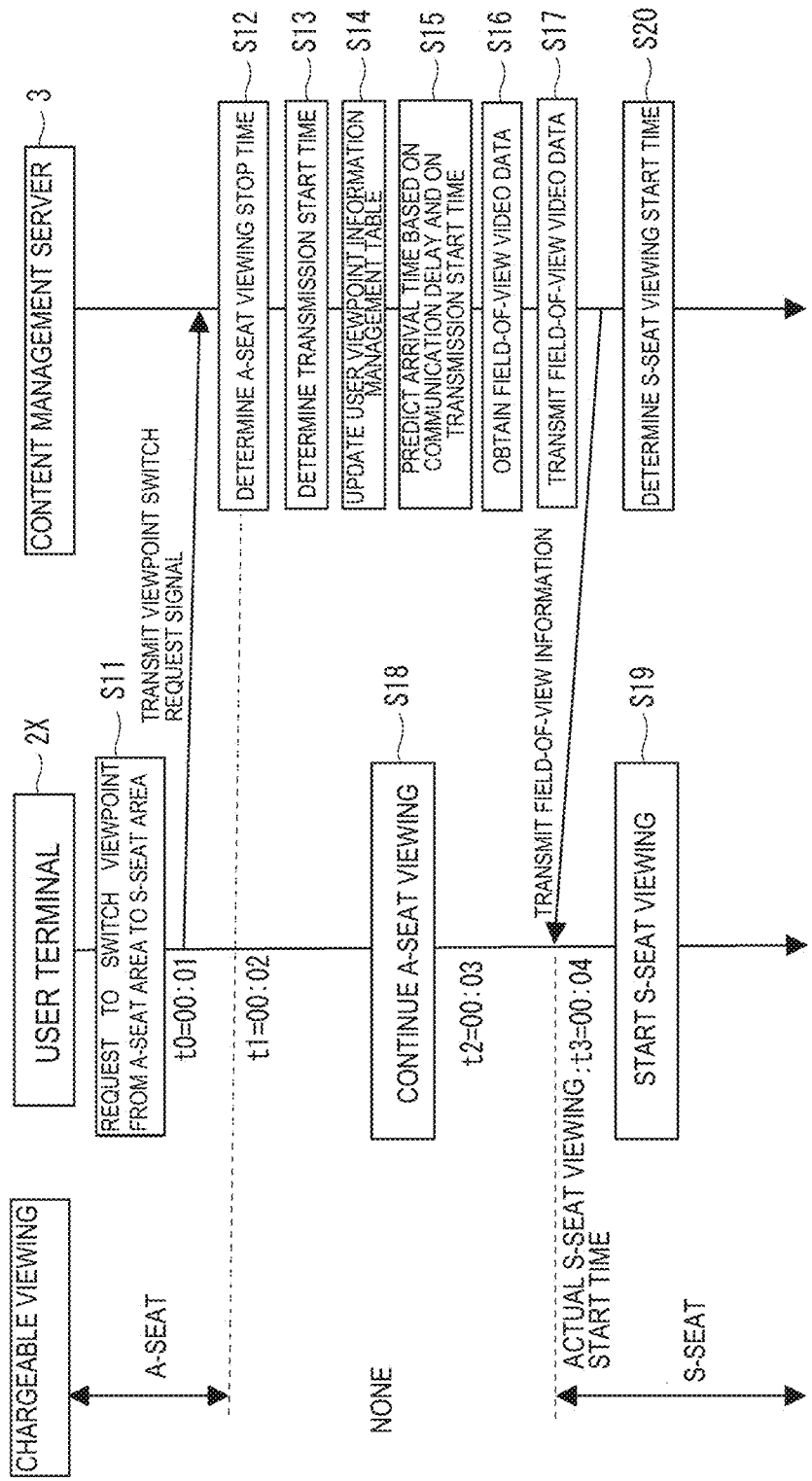
FIG. 13 is a sequence diagram of a series of processes of the video content distribution system according to at least one embodiment.

The video content distribution system according to at least one embodiment of this disclosure is described next with reference to FIG. 12 and FIG. 13. FIG. 12 is a diagram of function blocks of a control unit 32A of the content management server 3 according to at least one embodiment. FIG. 13 is a sequence diagram of a series of processes of the video content distribution system according to at least one embodiment. The video content distribution system, e.g., video content distribution system, according to at least one embodiment differs from the video content distribution system according to at least one embodiment in the function of the control unit of the content management server 3. Specifically, the control unit 32A of the content management server 3 includes, in addition to the components of the control unit 32, a communication delay predicting unit 332 and an arrival time predicting unit 333.

As illustrated in FIG. 12, the communication delay predicting unit 332 is configured to predict a delay in communication between the content management server 3 and each user terminal 2. A delay in communication between the content management server 3 and the user terminal 2 is a period from the transmission of field-of-view video data that is associated with the post-switch viewpoint by the transmission unit 325 of the content management server 3 to the reception of this field-of-view video data by the reception unit 221 of the user terminal 2. This means that the communication delay depends heavily on the communication environment of the communication network 1. For example, after the content management server 3 (the information obtaining unit 322) obtains from the user terminal 2 information about the downstream communication speed of field-of-view video data that is associated with the viewpoint in the A-seat area (the pre-switch viewpoint), the communication delay predicting unit 332 may predict a delay in communication between the content management server 3 and the user terminal 2 based on the obtained downstream communication speed information.

The arrival time predicting unit 333 is configured to predict an arrival time at which field-of-view video data that is associated with a switched-to viewpoint arrives at the user terminal 2, based on the transmission start time determined by the transmission start time determining unit 329 and the communication delay predicted by the communication delay predicting unit 332.

A series of processes of the video content distribution system 100A according to at least one embodiment is described next with reference to FIG. 13. The series of processes of the video content distribution system according to at least one embodiment in FIG. 13 differs from the series of processes of the video content distribution system according to at least one embodiment in FIG. 8 in the method of determining the S-seat viewing start time (the A-seat viewing start time).

In Step S11, the user terminal 2X first transmits to the content management server 3 a viewpoint switch request signal for requesting a switch from a viewpoint in the A-seat area to a viewpoint in the S-seat area in a field-of-view video that is being displayed on the display unit 27. Details of Step S11 are the same as details of Step S1, which is illustrated in FIG. 8. Next, the viewing stop time determining unit 326 determines the A-seat viewing stop time (the first viewing stop time) in Step S12. Details of Step S12 are the same as details of Step S2, which is illustrated in FIG. 8.

In Step S13, the transmission start time determining unit 329 determines a transmission start time at which the transmission unit 325 starts transmitting field-of-view video data that is associated with the viewpoint in the S-seat area to the user terminal 2X. Details of Step S13 are the same as details of Step S3, which is illustrated in FIG. 8.

In Step S14, the user viewpoint information management table updating unit 324 updates data in the user viewpoint information management table (see FIG. 9), which is stored in the storage 33. Details of Step S14 are the same as details of Step S4, which is illustrated in FIG. 8.

In Step S15, the arrival time is predicted based on the communication delay and the transmission start time. In at least one embodiment, the communication delay predicting unit 332 first predicts a delay in communication between the content management server 3 and the user terminal 2X. Thereafter, the arrival time predicting unit 333 predicts an arrival time at which the field-of-view video data that is associated with the viewpoint in the S-seat area arrives at the user terminal 2X, based on the transmission start time determined by the transmission start time determining unit 329 and the communication delay predicted by the communication delay predicting unit 332. The predicted arrival time is t3=00:04.

In Step S16, the content management server 3 obtains field-of-view video data that is associated with the viewpoint in the S-seat area from the content server 5S, where 360-degree space video data that is associated with the viewpoint in the S-seat area is stored. Details of Step S16 are the same as details of Step S5, which is illustrated in FIG. 8. In Step S17, the content management server 3 transmits the field-of-view video data that is associated with the viewpoint in the S-seat area to the user terminal 2X. Details of Step S17 are the same as details of Step S6, which is illustrated in FIG. 8. Details of Step S18 and Step S19 are the same as details of Step S7 and Step S8, which are illustrated in FIG. 8.

Next, the viewing start time determining unit 327 determines in Step S20 an S-seat viewing start time (the second viewing start time) at which the user X starts viewing the field-of-view video from the viewpoint in the S-seat area, i.e., the post-switch viewpoint. Specifically, the viewing start time determining unit 327 determines as the S-seat viewing start time the arrival time predicted by the transmission start time determining unit 333 (t3=00:04).

According to at least one embodiment, the viewing stop time determining unit 326 determines as the A-seat viewing stop time an acquisition time at which a viewpoint switch request signal (in particular, information contained in a viewpoint switch request signal, for example, user ID information) is obtained (t1=00:02), and an arrival time at which field-of-view video data that is associated with the viewpoint in the S-seat area arrives at the user terminal 2X (t3=00:04) is determined as the S-seat viewing start time. The period between the acquisition time t1 and the arrival time t3 (2 seconds) is not counted as a field-of-view video viewing period in this manner, which helps to improve the user's degree of satisfaction with a video content distribution service and to convince the user more that the charge for the service is fair.

Figure 14:
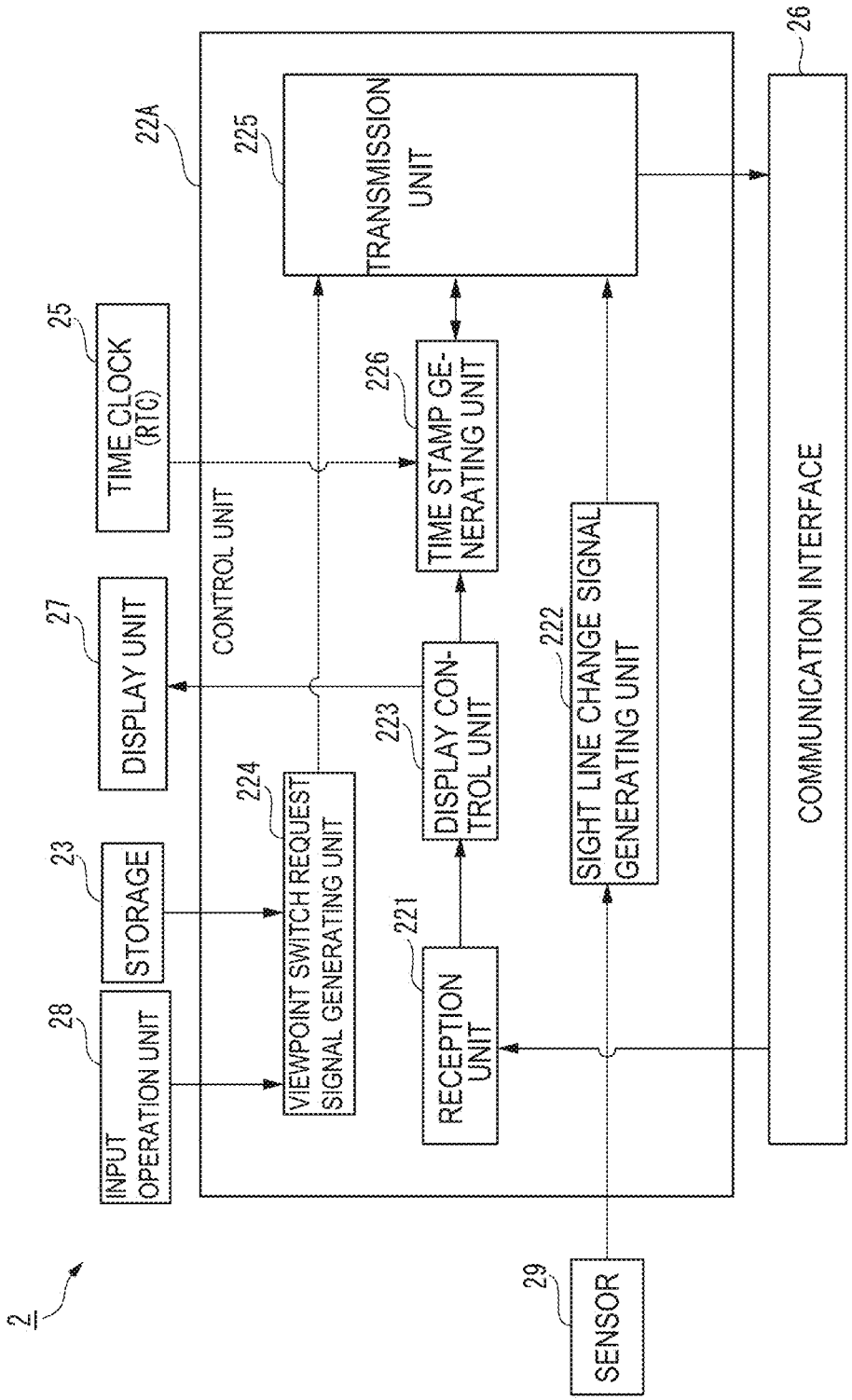
FIG. 14 is a diagram of function blocks of a control unit of the user terminal according to at least one embodiment of this disclosure.
Figure 15:
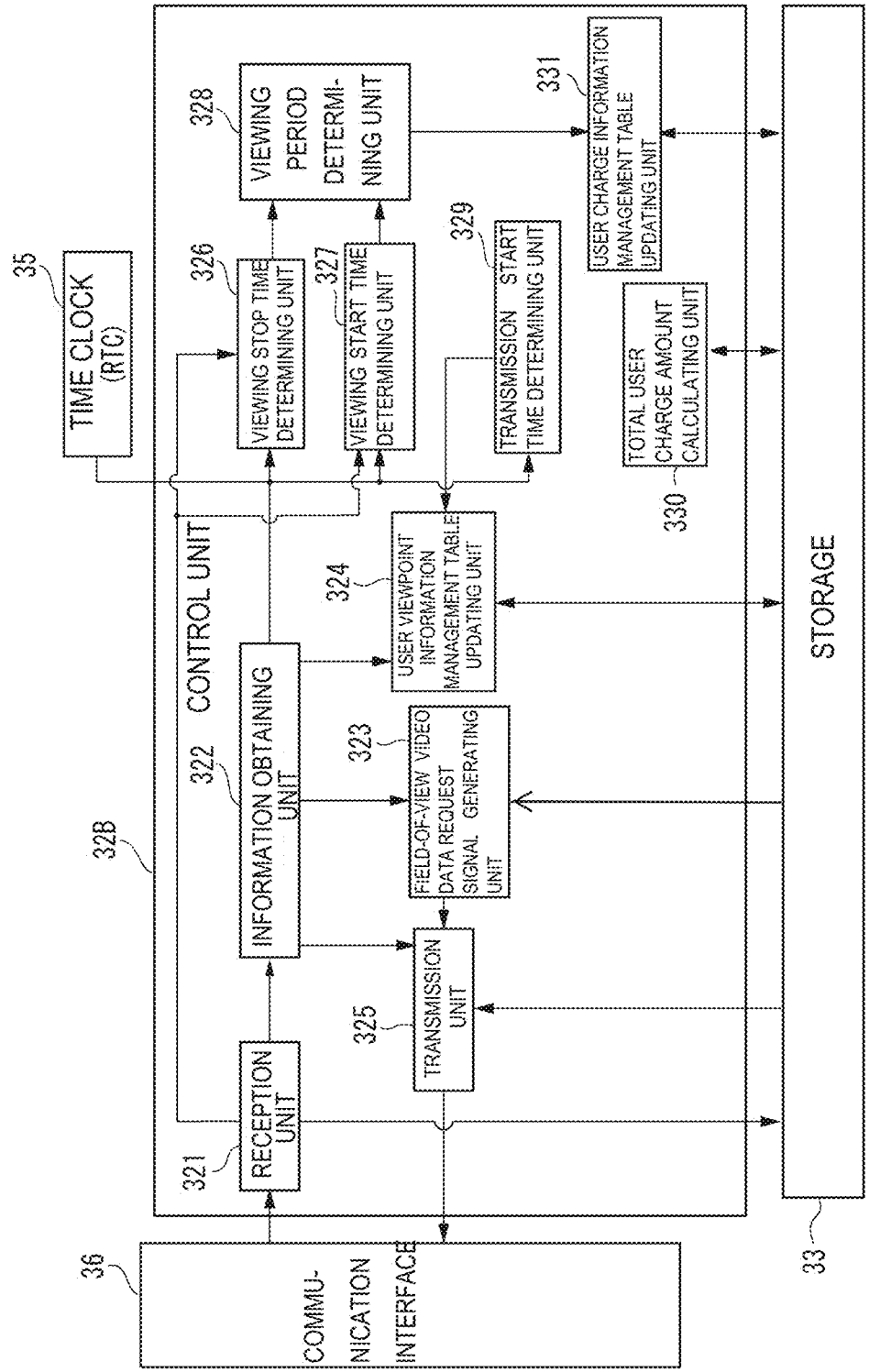
FIG. 15 is a diagram of function blocks of a control unit of the content management server according to at least one embodiment.

A video content distribution system, e.g. video content distribution system 100, according to at least one embodiment of this disclosure is described next with reference to FIG. 14 to FIG. 16. FIG. 14 is a diagram of function blocks of a control unit 22A of the user terminal 2 according to at least one embodiment of this disclosure. FIG. 15 is a diagram of function blocks of a control unit 32B of the content management server 3 according to at least one embodiment. FIG. 16 is a sequence diagram of a series of processes of the video content distribution system according to at least one embodiment. The video content distribution system according to at least one embodiment differs from the video content distribution system 100 according to at least one embodiment in the function of the control unit of each user terminal 2 and the function of the control unit of the content management server 3. Specifically, the control unit 22A of each user terminal 2 includes, in addition to the components of the control unit 22, a time stamp generating unit 226. A control unit 32B of the content management server 3 differs from the control unit 32 in the method that is used by the viewing stop time determining unit 326 to determine a viewing stop time and the method that is used by the viewing start time determining unit 327 to determine a viewing start time.

As illustrated in FIG. 14, the time stamp generating unit 226 is configured to generate a first time stamp and a second time stamp by referring to the current time that is indicated by the time clock 25. The first time stamp indicates a transmission start time at which the transmission unit 225 starts transmitting a viewpoint switch request signal to the content management server 3 (for example, t0=00:01). The second time stamp indicates a display start time at which the display control unit 223 starts displaying on the display unit 27 the field-of-view video from the switched-to viewpoint (for example, a viewpoint in the S-seat area) (for example, t3=00:04). The transmission unit 225 transmits the first and second time stamps generated by the time stamp generating unit 226 to the content management server 3 via the communication interface 26.

A series of processes of the video content distribution system according to the third embodiment is described next with reference to FIG. 16. The series of processes of the video content distribution system according to at least one embodiment differs from the series of processes of the video content distribution system 100 according to at least one embodiment in the method of determining the A-seat viewing stop time (the S-seat viewing stop time) and the S-seat viewing start time (the A-seat viewing start time).

In Step S21, the user terminal 2X (transmission unit 225) first transmits to the content management server 3 a first time stamp and a viewpoint switch request signal for requesting a switch from a viewpoint in the A-seat area to a viewpoint in the S-seat area in a field-of-view video that is being displayed on the display unit 27. The first time stamp is generated by the time stamp generating unit 226, and indicates a transmission start time at which the transmission unit 225 starts transmitting the viewpoint switch request signal to the content management server 3 (t0=00:01).

In Step S22, the viewing stop time determining unit 326 determines the A-seat viewing stop time (the first viewing stop time) at which the user X stops viewing the field-of-view video from the viewpoint in the A-seat area, i.e., the pre-switch viewpoint. In at least one embodiment, the viewing stop time determining unit 326 determines as the A-seat viewing stop time a transmission start time that is indicated by the first time stamp transmitted from the user terminal 2X (t0=00:01). The subsequent steps from Step S23 to Step S27 are the same as Steps S3 to S7, which are illustrated in FIG. 8, and descriptions on Steps S23 to S27 are therefore omitted.

In Step S28, the display control unit 223 displays the field-of-view video from the viewpoint in the S-seat area on the display unit 27, based on the field-of-view video data that is associated with the viewpoint in the S-seat area. The time stamp generating unit 226 then generates the second time stamp that indicates a display start time at which the display control unit 223 starts displaying on the display unit 27 the field-of-view video from the viewpoint in the S-seat area (for example, t3=00:04). The transmission unit 225 transmits the generated second time stamp to the content management server 3.

In Step S29, the viewing start time determining unit 327 determines the S-seat viewing start time (the second viewing start time) at which the user X starts viewing the field-of-view video from the viewpoint in the S-seat area, i.e., the post-switch viewpoint. Specifically, the viewing start time determining unit 327 determines as the S-seat viewing start time a display start time that is indicated by the second time stamp transmitted from the user terminal 2X (t3=00:04).

According to at least one embodiment, a transmission start time indicated by the first time stamp at which the transmission unit 225 starts transmitting a viewpoint switch request signal to the content management server 3 (t0=00:01) is determined as the A-seat viewing stop time, and a display start time indicated by the second time stamp at which the display control unit 223 starts displaying on the display unit 27 the field-of-view video from the viewpoint in the S-seat area (t3=00:04) is determined as the S-seat viewing start time. The period between the transmission start time t0 and the display star time t3 (3 seconds) is not counted as a field-of-view video viewing period in this manner, which helps to improve the user's degree of satisfaction with a video content distribution service and to convince the user more that the charge for the service is fair.

The above descriptions of some of the embodiments are not to be read as a restrictive interpretation of the technical scope of this disclosure. The above described embodiments are merely given as an example, and a person skilled in the art would understand that various modifications can be made to the embodiments within the scope of this disclosure set forth in the scope of patent claims. Thus, the technical scope of this disclosure is to be defined based on the scope of this disclosure set forth in the scope of patent claims and an equivalent scope thereof.

What is claimed is:

1. A content distribution system comprising:
    a user terminal on which contents are viewable, wherein the user terminal comprises:
       a first unit configured to receive field-of-view data;
       a second unit configured to generate, in response to input operation on the user terminal, a signal for requesting a switch from a first viewpoint to a second viewpoint; and
    a server connected to the user terminal via a communication network, wherein the server comprises:
       a third unit configured to determine a first viewing duration in which the contents are displayed from the first viewpoint, and to determine a second viewing duration in which the contents are displayed from the second viewpoint; and
       a fourth unit configured to determine a total amount to be charged to the user based on a combination of charges for the first viewing duration and the second viewing duration at the second viewpoint,
    wherein a charge per unit time for the first viewpoint is different form a charge per unit time for the second viewpoint.

2. The content distribution system according to claim 1, wherein the server is further configured to update user charge information that is associated with the first viewpoint based on the first viewing duration.

3. The content distribution system according to claim 2, wherein the server is further configured to update user charge information that is associated with the second viewpoint based on the second viewing duration.

4. The content distribution system according to claim 1, wherein the server is further configured to determine the total amount to the charged to the user based on a viewing duration for each corresponding viewpoint of all viewpoints accessed by the user.

5. The content distribution system according to claim 1, wherein the server is further configured to:
    transmit the field-of-view data to the user terminal, and
    determine a time at which the transmitting of the field-of-view data that is associated with the second viewpoint begins.

6. The content distribution system according to claim 5, wherein the server is further configured to determine as the first viewing duration based on an acquisition time at which the signal is obtained.

7. The content distribution system according to claim 5, wherein the server is further configured to determine as the second viewing duration based on the time.

8. The content distribution system according to claim 1, wherein the server is further configured to:
    transmit the field-of-view data to the user terminal,
    determine a time at which the transmitting the field-of-view data that is associated with the second viewpoint begins,
    predict a delay in communication between the server and the user terminal, and
    predict an arrival time at which the field-of-view data that is associated with the second viewpoint arrives at the user terminal, based on the determined time and the predicted delay.

9. The content distribution system according to claim 8, wherein the server is further configured to determine the first viewing duration based on a time at which the signal is obtained.

10. The content distribution system according to claim 8, wherein the server is further configured to determine the second duration based on the predicted arrival time.

11. The content distribution system according to claim 1, wherein the user terminal is further configured to generate a first time stamp and a second time stamp, the first time stamp indicating a time at which the signal is transmitted to the server, the second time stamp indicating a display start time at which displaying of the field-of-view data from the second viewpoint begins.

12. The content distribution system according to claim 11, wherein the server is configured to receive the first time stamp and the second time stamp from the user terminal.

13. The content distribution system according to claim 11, wherein the server is further configured to determine the first viewing duration based on the received first time stamp.

14. The content distribution system according to claim 11, wherein the server is further configured to determine the second viewing duration based on the received second time stamp.

15. The content distribution system according to claim 1, wherein the server further comprises:
    a fifth unit configured to determine a first viewing start time at which the user terminal starts displaying the contents from the first viewpoint, and a second viewing start time at which the user terminal starts displaying the contents from the second viewpoint; and
    a sixth unit configured to determine a first viewing stop time at which the user terminal stops displaying the contents from the first viewpoint, and a second viewing stop time at which the user terminal stops displaying the contents from the second viewpoint,
    wherein the third unit is configured to determine the first viewing duration based on the first viewing start time and the first viewing stop time, and to determine the second viewing duration based on the second viewing start time and the second viewing stop time.

* * * * *